(12) United States Patent
Nakajima et al.

(10) Patent No.: US 6,718,081 B2
(45) Date of Patent: Apr. 6, 2004

(54) OPTICAL SWITCH

(75) Inventors: Ichiro Nakajima, Kawasaki (JP); Satoshi Kuroyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 09/960,299

(22) Filed: Sep. 24, 2001

(65) Prior Publication Data

US 2002/0122617 A1 Sep. 5, 2002

(30) Foreign Application Priority Data

Mar. 5, 2001 (JP) ........................................ 2001-060184

(51) Int. Cl.[7] ................................................. G02B 6/26
(52) U.S. Cl. ............................................................ 385/16
(58) Field of Search ............................. 385/15, 16, 17, 385/18, 33, 1, 2, 3, 4, 5, 6

(56) References Cited

U.S. PATENT DOCUMENTS 6,519,060 B1 * 2/2003 Liu .............................. 359/127

FOREIGN PATENT DOCUMENTS

| JP | 54-98505 | 8/1979 |
|---|---|---|
| JP | 5-273603 | 10/1993 |
| JP | 11-41636 | 2/1999 |

* cited by examiner

*Primary Examiner*—Javaid H. Nasri
(74) *Attorney, Agent, or Firm*—Staas & Halsey LLP

(57) ABSTRACT

In an optical switch comprising a plurality of input ports and output ports, and performing a path establishment between the input ports and output ports, interception means intercept an optical signal inputted to the optical switch during a path switchover. Alternatively, a controller of the optical switch controls input movable mirrors, during the path switchover, so as to prevent optical signals deflected by movable mirrors from being outputted to all of the output ports except an output port for a new path establishment, e.g. during a path switchover, so that optical signals reflected by the input movable mirrors may not be entered into other output movable mirrors except an output movable mirror necessary for a new path establishment. Alternatively, the output movable mirrors of the optical switch are separated into a plurality of areas to be arranged, and are arranged in each area so that the path switchover between two output movable mirrors is performed without the optical signal crossing other output movable mirrors.

10 Claims, 18 Drawing Sheets

| 12_1 | 12_2 | 12_3 | | <64 x 64 SWITCH> | | | |
|---|---|---|---|---|---|---|---|
| λ1 | λ2 | λ3 | λ4 | λ1 | λ2 | λ3 | λ4 |
| λ3 | λ4 | λ1 | λ2 | λ3 | λ4 | λ1 | λ2 |
| λ1 | λ2 | λ3 | λ4 | λ1 | λ2 | λ3 | λ4 |
| λ3 | λ4 | λ1 | λ2 | λ3 | λ4 | λ1 | λ2 |
| λ1 | λ2 | λ3 | λ4 | λ1 | λ2 | λ3 | λ4 |
| λ3 | λ4 | λ1 | λ2 | λ3 | λ4 | λ1 | λ2 |
| λ1 | λ2 | λ3 | λ4 | λ1 | λ2 | λ3 | λ4 |
| λ3 | λ4 | λ1 | λ2 | λ3 | λ4 | λ1 | λ2 |

12_64

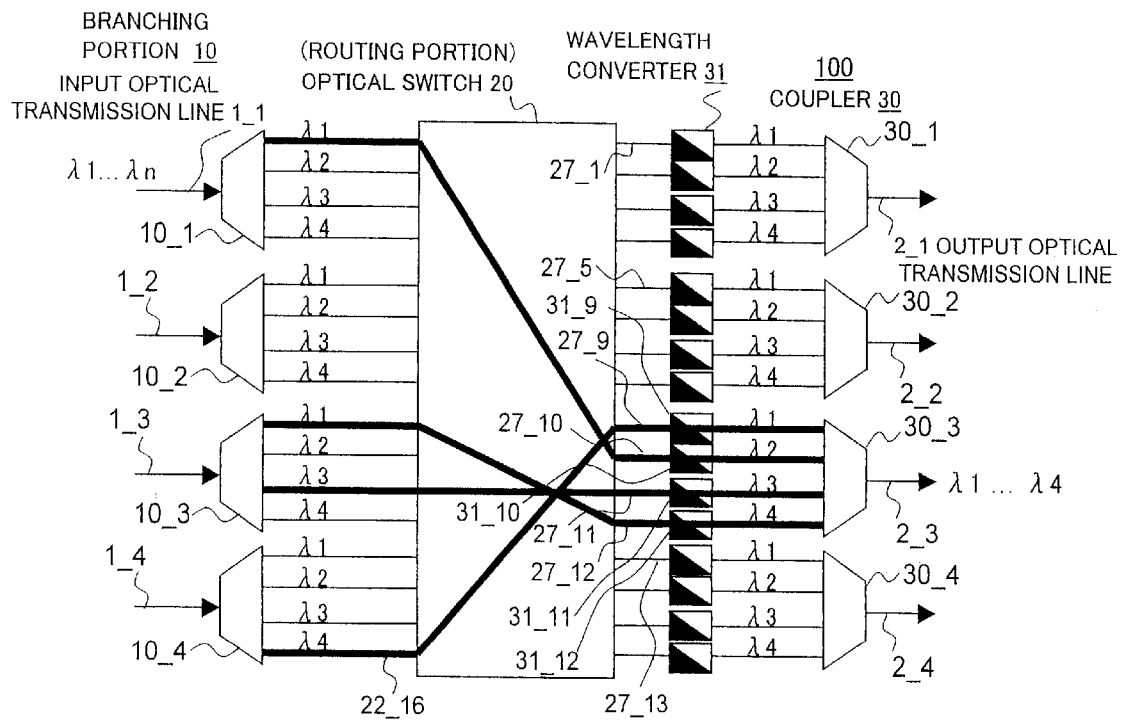
FIG.10A  BEFORE FAULT
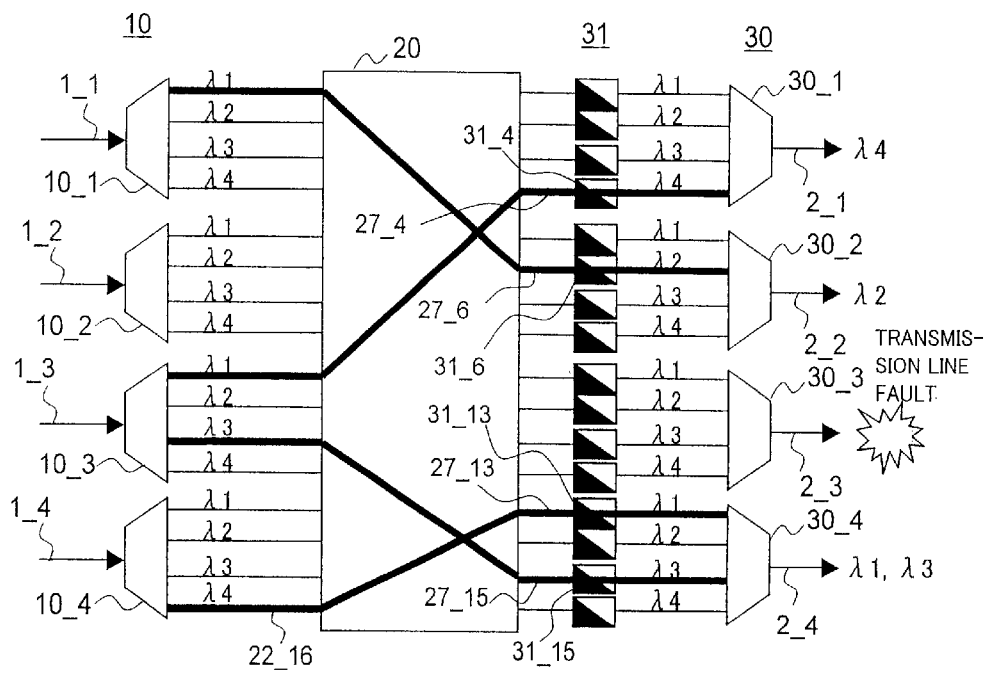
FIG.10B  AFTER FAULT

FIG.12A

<8 PORTS x 4λ>

OUTPUT WAVELENGTH λ3

OUTPUT WAVELENGTH λ4

| 2_1 | 2_2 | 2_3 | 2_1 | 2_2 | 2_3 |
|---|---|---|---|---|---|
| 2_8 | → | 2_4 | 2_8 | | 2_4 |
| 2_7 | 2_6 | 2_5 | 2_7 | 2_6 | 2_5 |
| 2_1 | 2_2 | 2_3 | 2_1 | 2_2 | 2_3 |
| 2_8 | | 2_4 | 2_8 | | 2_4 |
| 2_7 | 2_6 | 2_5 | 2_7 | 2_6 | 2_5 |

OUTPUT WAVELENGTH λ2

OUTPUT WAVELENGTH λ1

FIG.12B

<9-12 PORTS>

| 2_1 | 2_2 | 2_3 | 2_4 |
|---|---|---|---|
| 2_12 | → | | 2_5 |
| 2_11 | | | 2_6 |
| 2_10 | 2_9 | 2_8 | 2_7 |

FIG.12C

<13-20 PORTS>

| 2_1 | 2_2 | 2_3 | 2_4 | 2_5 |
|---|---|---|---|---|
| 2_16 | | 2_17 | | 2_6 |
| 2_15 | 2_20 | | 2_18 | 2_7 |
| 2_14 | | 2_19 | | 2_8 |
| 2_13 | 2_12 | 2_11 | 2_10 | 2_9 |

FIG.12D

<21-28 PORTS>

| 2_1 | 2_2 | 2_3 | 2_4 | 2_5 | 2_6 |
|---|---|---|---|---|---|
| 2_20 | | 2_21 | 2_22 | | 2_7 |
| 2_19 | 2_28 | → | | 2_23 | 2_8 |
| 2_18 | 2_27 | | | 2_24 | 2_9 |
| 2_17 | | 2_26 | 2_25 | | 2_10 |
| 2_16 | 2_15 | 2_14 | 2_13 | 2_12 | 2_11 |

FIG.15A
Prior Art
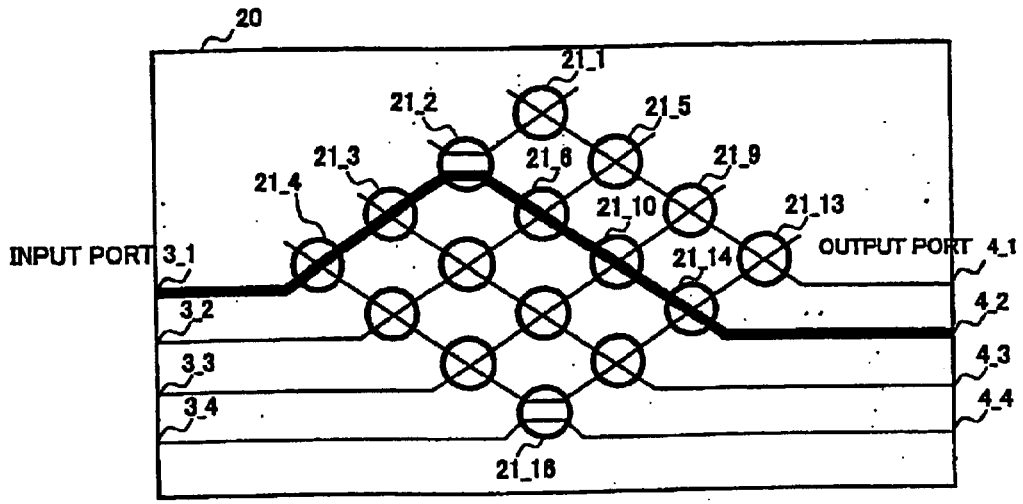
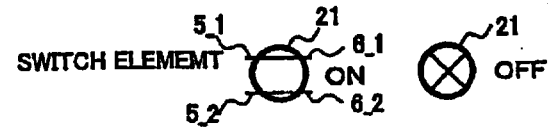
FIG.15B
Prior Art
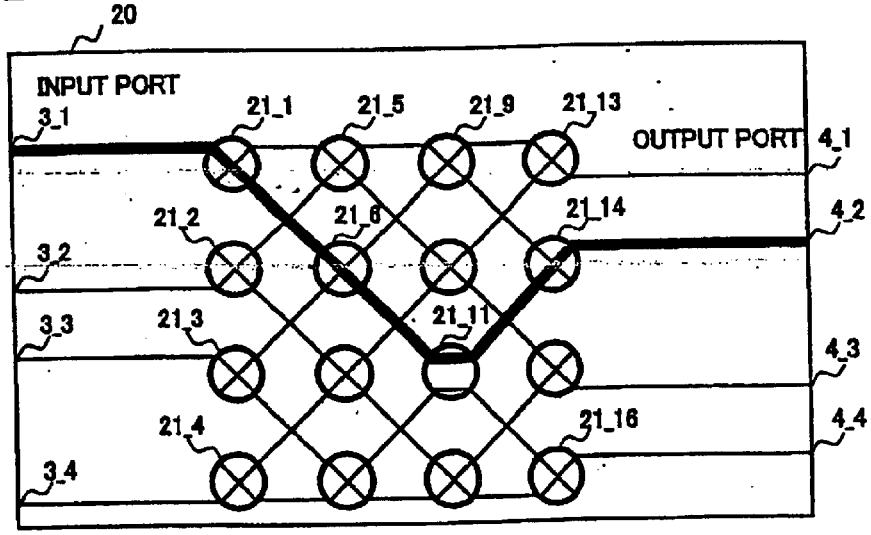

FIG.19A BEFORE SWITCHOVER
Prior Art
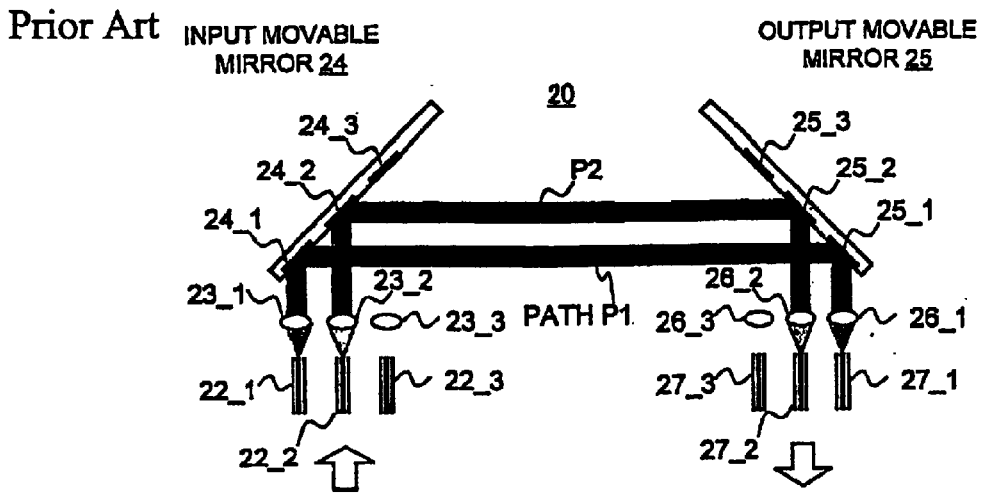
FIG.19B DURING SWITCHOVER
Prior Art
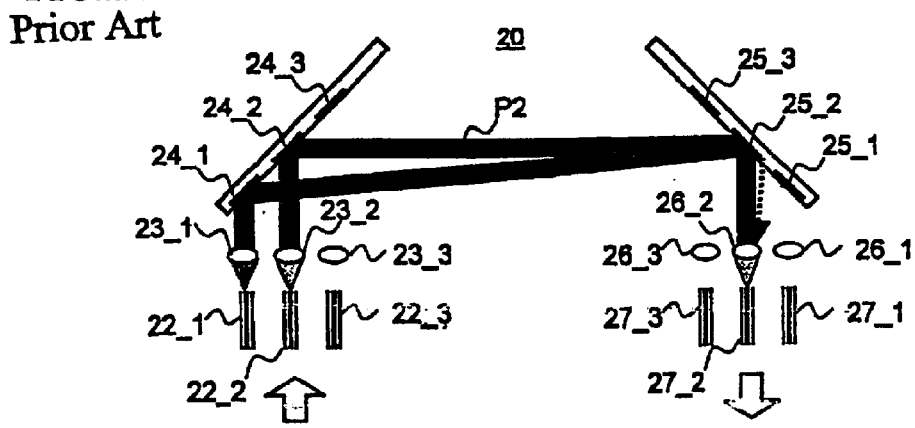
FIG.19C AFTER SWITCHOVER
Prior Art
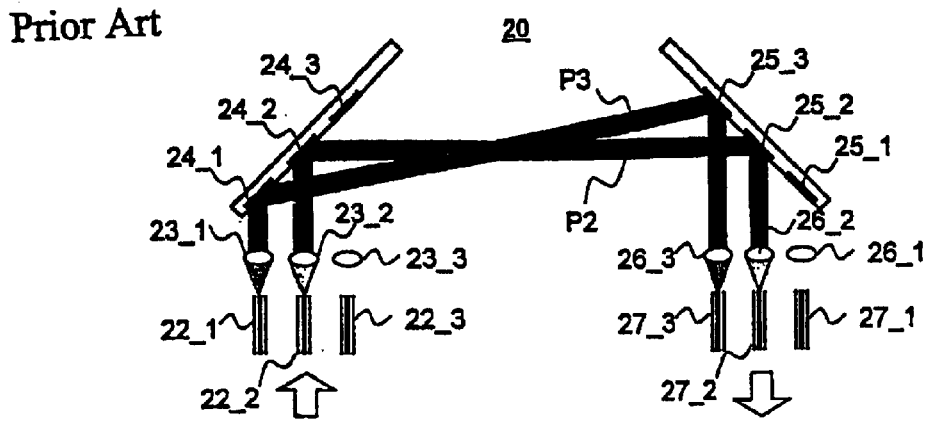

OPTICAL SWITCH

BACKGROUND OF THE INVENTION

1. Field of the Invention

The present invention relates to an optical switch, and in particular to an optical switch comprising a plurality of input ports and output ports, and performing a path establishment between the input ports and the output ports.

With a recent traffic growth, an increase in network capacity has been demanded. Therefore, construction of an optical network based on Wavelength Division Multiplexing (WDM) technology has been required in a backbone network.

The WDM technology increases a point-to-point transmission capacity by transmitting a plurality of optical signals having different wavelengths on a single optical transmission line. Also, for applications of the WDM technology, there are cited an optical switch apparatus such as an add-drop multiplexer adding/dropping information of a specified wavelength, and an optical cross-connect switching over a transmission line per optical wavelength.

In such an optical switch apparatus, an optical switch to perform a path switchover of an optical signal per wavelength plays an important part.

2. Description of the Related Art

FIG. 13 shows an arrangement (1) of an optical switch apparatus (optical cross-connect) 100 including a general optical switch (routing portion) 20. The optical switch apparatus 100 accommodates a plurality of input optical transmission lines 1_1–1_m (hereinafter, occasionally represented by a reference numeral 1) and output optical transmission lines 2_1–2_m (hereinafter, occasionally represented by a reference numeral 2), and routes wavelength-multiplexed optical signals coming from the input optical transmission lines 1 to the desired output optical transmission lines 2 per wavelength. Also, an operation system 41 shown in FIG. 13 monitors/controls the optical switch apparatus 100 to perform a path establishment and a path switchover.

The optical switch apparatus 100 is composed of branching portions 10_1–10_m (hereinafter, occasionally represented by a reference numeral 10) branching the wavelength-multiplexed optical signals (wavelengths: λ1, λ2, ..., λn) coming from the input optical transmission lines 1_1–1_m, the optical switch (routing portion) 20 routing the optical signals inputted from the input ports to the desired output ports, wavelength converters 31_11–31_1n, ..., 31_m1–31_mn (hereinafter, occasionally represented by a reference numeral 31) converting the wavelengths of the inputted optical signals into desired wavelengths, and couplers 30_1–30_m (hereinafter, occasionally represented by a reference numeral 30) coupling the optical signals whose wavelengths are converted.

For examples of the wavelength converter 31, there are cited a method of converting a wavelength in the state of light by making use of a Semiconductor Optical Amplifier (SOA), a method of converting a wavelength by making use of a light-electricity converter and an electricity-light converter, and the like. Also, the branching portion 10 and the coupler 30 can be composed of elements using an Arrayed Waveguide Grating (AWG) and a dielectric multi-layer film.

FIG. 14 shows an arrangement (2) of the optical switch apparatus (optical cross-connect) 100 including the optical switch. In this arrangement (2), light reproducers 11_11–11_1n, ..., 11_m1–11_mn are inserted at the preceding stage of the optical switch 20 in the optical switch apparatus 100 shown in FIG. 13, and light reproducers 32_11–32_1n, ..., 32_m1–32_mn, which also serve as wavelength converters, are arranged instead of the wavelength converters 31 at the subsequent stage.

The light reproducers 11_11–11_1n, ..., 11_m1–11_mn are thus provided because the optical cross-connect 100 is generally deployed in a long-distance network in many cases and an optical signal waveform inputted to the optical cross-connect 100 deteriorates to the extent that the signal with the original quality can not be reproduced only with an amplification of an optical amplifier.

Also, for example of the optical switch 20 shown in FIGS. 13 and 14, there are cited a waveguide-type switch utilizing a thermal optical effect, a mechanical-type switch utilizing a motor, and the like.

FIGS. 15A and 15B show an arrangement of the optical switch 20 using switch elements 21_1–21_16 (hereinafter, occasionally represented by a reference numeral 21) of a Mach-Zehnder interference-type which is the waveguide-type switch.

The optical switch element 21 is a two-input-two-output-type switch having input terminals 5_1 and 5_2, and output terminals 6_1 and 6_2. When the element 21 is on, the input terminal 5_1 and the output terminal 6_1 are connected, and the input terminal 5_2 and the output terminal 6_2 are connected respectively. When the element 21 is off, the input terminal 5_1 and the output terminal 6_2 are connected, and the input terminal 5_2 and the output terminal 6_1 are connected respectively.

Although the optical switch 20 in FIG. 15A is different from that in FIG. 15B for the connection method of the optical switch elements 21, both switches comprise a four-input-four-output optical switch 20 which connect input ports 3_1–3_4 to output ports 4_1–4_4 in a one-to-one relationship.

In case a path is established between the input port 3_1 and the output port 4_2 for example, the optical switch 20 in FIG. 15A sets the optical switch elements 21_4, 21_3, 21_6, 21_10, and 21_14 off, and sets only the optical switch element 21_2 on. In the optical switch 20, the numbers of the optical switch elements through which the paths pass are not equal.

On the other hand, the optical switch 20 in FIG. 15B sets the optical switch elements 21_1, 21_6, and 21_14 off, and sets only the optical switch element 21_11 on. This optical switch 20 is called PI-LOSS composition, where the number of the optical switch elements 21 through which each path passes is 4, so that optical losses on the paths are basically equal.

These optical switches 20 have problems as follows:

(1) Crosstalk occurs in the optical switches 20, so that a crosstalk signal has a bad influence on an optical signal;
(2) Since the number of the optical switch elements required by the optical switches 20 increases in proportion to the square of the number of the input/output ports and the insertion loss increases, it is difficult to enlarge the scale.

The problem (1) will be first described.

FIG. 16 illustrates crosstalks which occur in the above-mentioned four-input-four-output optical switch 20. When the path is established between the input port 3_1 and the output port 4_2 and an optical signal S is transmitted through this path as shown, the optical signal S simultaneously leaks to the output ports 4_1, 4_3, and 4_4, so that crosstalks C1, C2, and C3 occur.

Crosstalks caused by the optical signals of other paths, which are similar to these crosstalks C1–C3, also occur at the output ports 4_1–4_4. All of the crosstalks are overlapped per output port, which forms the crosstalk of each output port.

For a solution of the problem (1), a crosstalk shutdown apparatus mentioned in the Japanese Patent Application Laid-open No.11-41636 is composed so that a crosstalk which propagates through the input port and the output port, and a crosstalk within the optical signal are detected at the input port and/or output port, are intercepted, thereby passing only the optical signal.

The problem (2) will be described.

For the solution of the problem (2), N input×N output optical switch 20 using 2N (N=16 in FIG. 17) movable mirrors as shown in FIG. 17 has been proposed. In this optical switch 20, the number of the mirrors increases in proportion to the number of the input/output ports. Accordingly, since neither the number of the mirrors (the number of the switch elements) increases nor the insertion loss increases, compared with the optical switch 20 shown in FIG. 15, the N input×N output optical switch 20 is considered suitable for enlarging the scale.

The movable mirror-type optical switch 20 is composed of input optical fibers 22_1–22_16 (hereinafter, occasionally represented by a reference numeral 22), input movable mirrors 24_1–24_16 (hereinafter, occasionally represented by a reference numeral 24) corresponding to the input optical fibers 22, output optical fibers 27_1–27_16 (hereinafter, occasionally represented by a reference numeral 27), and output movable mirrors 25_1–25 16 (hereinafter, occasionally represented by a reference numeral 25) corresponding to the output optical fibers 27.

The optical signal inputted from the input optical fiber 22_3, for example, is deflected (reflected) at the movable mirrors 24_3 and 25_14 to be transmitted to the output optical fiber 27_14.

The optical switch 20 is provided with a controller (not shown) controlling the angles of the movable mirrors 24 and 25 in order to establish arbitrary paths between the input optical fibers 22 and the output optical fibers 27.

In such an optical switch 20, the crosstalk described referring to FIG. 16 assumes an accumulated value of leaked lights from other paths, which can be usually neglected if a feedback control is performed to the direction of a desired movable mirror.

However, when the optical signal from the input optical fiber 22_3 is switched over from the output optical fiber 27_14 to the output optical fiber 27_1 for example, upon a path establishment or an occurrence of a transmission line fault, the optical signal sometimes passes through the output movable mirror 25 used for another path during the switchover, so that the crosstalk (crosstalk during the switchover) occurs at this time, resulting in a bad influence on a signal quality.

FIG. 18 shows a state of a crosstalk during switchover which occurs at this time. In the optical switch 20, a path P1 is established between the input optical fiber 22_1 and the output optical fiber 27_k, while a path P2 is established between the input optical fiber 22_16 and the output optical fiber 27_16.

When the path P2 is switched over to a path P3 between the input optical fiber 22_16 and the output optical fiber 27_1 for example, a crosstalk C occurs in the optical fiber 27_k during the switchover, which has a bad influence on the quality of the optical signal of the path P1. Especially, when the wavelengths of the paths P1 and P2 are the same λn, bad influence on the quality of the optical signal caused by the crosstalk C which occurs on the output optical fiber 27_k is significant.

Furthermore, when the optical switch 20 is an optical cross-connect, there is a possibility that paths corresponding to the number of transmission line wavelengths simultaneously perform switchover operations (or establishment operations), thereby increasing the possibility of the crosstalk C occurrence.

FIGS. 19A–19C show that the crosstalk from the input movable mirror 24 adjoining the input movable mirror 24 is the largest.

In FIG. 19A, the path P1 through the movable mirrors 24_1 and 25_1 is established between the input optical fiber 22_1 and the output optical fiber 27_1, while the path P2 through the movable mirrors 24_2 and 25_2 is established between the input optical fiber 22_2 and the output optical fiber 27_2.

In FIG. 19B, when the path P1 is switched over to the path P3 (see FIG. 19C) between the input optical fiber 22_1 and the output optical fiber 27_3, the optical signal from the input optical fiber 22_1 is deflected at the output movable mirror 25_2, during the switchover, to be outputted to the output optical fiber 27_2 as a crosstalk light.

As for the crosstalk light, the crosstalk of the optical signal deflected from the input movable mirror 24_1 (or 24_3) adjoining the input movable mirror 24_2 becomes the largest. This is because the angle difference between the signal light and the crosstalk light becomes minimum.

In case such a crosstalk upon a switchover (or establishment) occurs at the optical signal on the output optical fiber (output port) side, the above-mentioned crosstalk shutdown apparatus can not shut down or intercept the crosstalk.

SUMMARY OF THE INVENTION

It is accordingly an object of the present invention to provide an optical switch comprising a plurality of input ports and output ports, performing a path establishment between the input ports and the output ports, and reducing a crosstalk which occurs upon the path establishment or a path switchover.

In order to achieve the above-mentioned object, an optical switch of the present invention comprises: a plurality of input ports, a plurality of output ports, and interception means for intercepting an optical signal at a preceding stage of the input ports during a path switchover.

Namely, in case of a path establishment, a path switchover, a connection switchover upon a fault, and the like for example, an optical switch performs a path switchover so that optical signals inputted from input ports may be outputted to any of output ports.

Interception means intercept the optical signal inputted to the optical switch during the path switchover, i.e. from the start of the path switchover to the end thereof Thus, during the path switchover, a crosstalk caused by the optical signal does not occur within the optical switch.

As the interception means, an optical switch element provided between the optical switch and a light source of the optical signal may be used.

Also, as the interception means, an optical amplifier provided between the optical switch and a light source of the optical signal may be used and by decreasing a gain of the optical amplifier, for example, during the path switchover, the optical signal may be intercepted.

Also, as the interception means, a controller which turns on/off a light source of the optical signal may be used, so that by turning off the light source no optical signal may be intercepted to provide an intercepted state.

Also, as the interception means, an optical modulator modulating the optical signal may be used, and by turning off a modulation driver for example, the outputted optical signal may be intercepted.

Also, as the interception means, a collimator controller shifting a focus of a collimator arranged on an input port side may be used, so that the optical signal inputted to the optical switch may be out of focus, scattered, and almost intercepted.

It is to be noted that the optical switch may comprise a movable mirror-type optical switch performing the path switchover with movable mirrors.

Furthermore, the present invention comprises: a plurality of input ports, a plurality of output ports, movable mirrors establishing paths between the input ports and the output ports, and a controller controlling the movable mirrors, during a path switchover, so as to prevent optical signals deflected by the movable mirrors from being outputted to all of the output ports except an output port for a new path establishment.

Also, in the present invention, the controller may control a first movable mirror, during the path switchover, so as to prevent an optical signal reflected by the first movable mirror from being entered into other movable mirrors except a second movable mirror necessary for a new path establishment.

Namely, the optical switch sequentially makes the optical signal inputted from the input port reflected by the first and the second movable mirror to be outputted to a predetermined output port.

Therefore, the controller controls the first movable mirror, during the path switchover, so as to prevent the optical signal reflected by the first movable mirror from being entered into the other movable mirrors except the second movable mirror necessary for a new path establishment.

Thus, the optical signal is not outputted from the output ports except the predetermined output port for the new path establishment during the switchover, resulting in no crosstalk.

Also, in the above-mentioned invention, a photodevice arranged on a path where the optical signal is not entered into the movable mirrors except the second movable mirror may be further provided, and the controller may control, during the path switchover, so as to prevent the optical signal from being entered into the movable mirrors except the second movable mirror based on the optical signal received by the photodevice.

Thus, the controller can control the angle of the first movable mirror more accurately.

Also, the present invention comprises: a plurality of input ports, a plurality of input ports, input movable mirrors respectively receiving optical signals from the input ports to establish paths between the input ports and the output ports, and output movable mirrors transmitting the optical signals through the input movable mirrors to the output ports, wavelengths of the optical signals entered into the input movable mirrors may be different from wavelengths of the optical signals entered into the input movable mirrors adjoined.

As described referring to FIGS. 19A–19C, the crosstalk from the input fiber adjoined becomes the largest. Especially, when the wavelengths are the same and the phases coincide with each other, the crosstalk becomes a coherent crosstalk to have a significant influence on the optical signal. According to the present invention, the coherent crosstalk can be avoided.

Also, in the above-mentioned present invention, the wavelengths of the optical signals entered into the input movable mirrors may be different from the wavelengths of the optical signals entered into the input movable mirrors which adjoin the input movable mirrors adjoined.

Thus, the coherent crosstalks from the adjoined path and the path which further adjoins the path adjoined can be avoided.

The present invention further comprises: a plurality of input ports, a plurality of output ports, input movable mirrors receiving optical signals from the input ports to establish paths between the input ports and the output ports, and output movable mirrors respectively outputting the optical signals from the input movable mirrors to the output ports, the output movable mirrors may be separated into a plurality of areas to be arranged, and further may be arranged in each area so that a path switchover between two output movable mirrors is performed without the optical signal crossing other output movable mirrors.

Namely, the output movable mirrors respectively output the optical signals from the input ports to the output ports. The output movable mirrors are separated into a plurality of areas to be arranged, and arranged so that a path switchover between arbitrary two output movable mirrors which belong to each area is performed without the optical signal crossing other output movable mirrors.

Thus, when the path switchover of changing the output movable mirror to the output movable mirror within the same area is performed, the path switchover can be performed without the optical signal crossing the other output movable mirrors, so that no crosstalk occurs.

Also, in the above-mentioned invention, output movable mirrors not corresponding to the output ports may be further included.

When existing output movable mirrors arranged in N×N are used for example, there is a case where the signal light between arbitrary two output movable mirrors belonging to each area can not be moved without crossing the other output movable mirrors.

Therefore, when the signal light between the arbitrary two output movable mirrors can be moved by crossing a certain output movable mirror, the output movable mirror is not used without being made correspond to the output ports. Thus, the existing output movable mirrors arranged in N×N can be used.

BRIEF DESCRIPTION OF THE DRAWINGS

FIGS. 10A and 10B are block diagrams showing an example of a path switchover in an optical switch apparatus including a general optical switch;

FIGS. 12A–12D are block diagrams showing an embodiment (11) of an optical switch according to the present invention;

FIGS. 15A and 15B are block diagrams showing an arrangement of a general optical switch;

FIGS. 19A–19C are block diagrams showing the maximum crosstalk upon a path switchover in a general 3D mirror optical switch.

Throughout the figures, like reference numerals indicate like or corresponding components.

DESCRIPTION OF THE EMBODIMENTS

Embodiment (1)

Figure 1A:
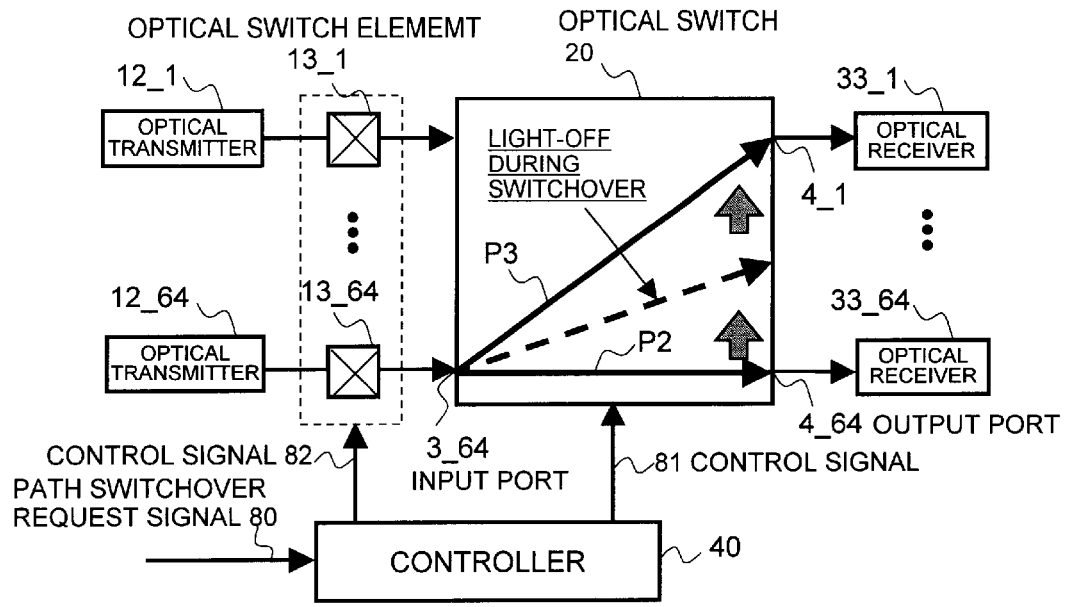
FIG. 1A is a block diagram showing an embodiment (1) of an optical switch according to the present invention.
Figure 1B:
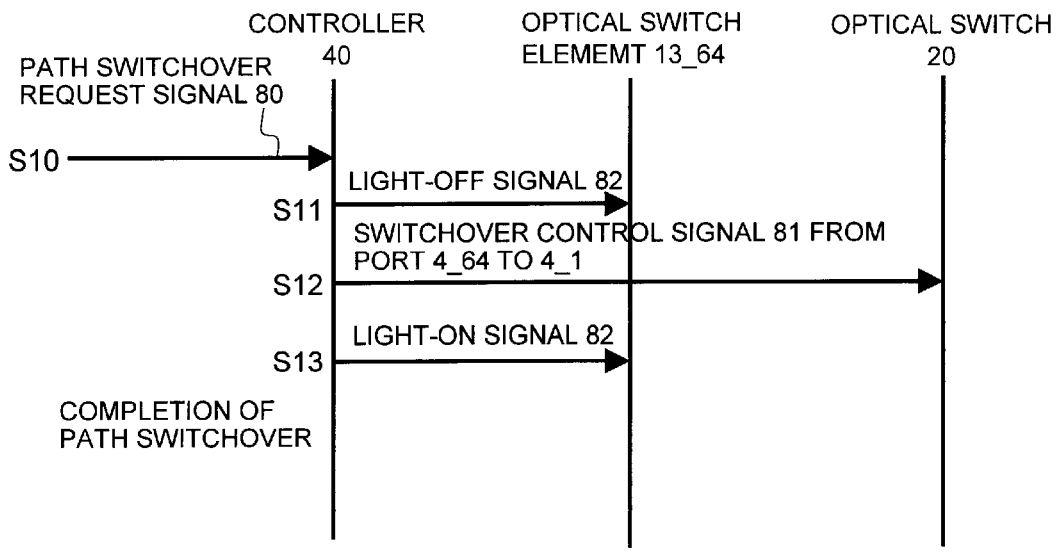
FIG. 1B is a sequence chart showing an embodiment (1) of an optical switch according to the present invention.

FIGS. 1A and 1B show an embodiment (1) of an optical switch 20 according to the present invention. In the embodiment (1), as shown in FIG. 1A, optical switch elements 13_1–13_64 (hereinafter, occasionally represented by a reference numeral 13) are respectively inserted into the preceding stage of the optical switch 20, i.e. between the optical switch 20 and optical transmitters 12_1–12_64 including light sources. A controller 40 controls the optical switch element 13 and the optical switch 20.

The optical switch element 13 and the portion within the controller 40 which controls the optical switch element 13 compose interception means for intercepting an optical signal.

Since a path switchover was performed with the optical signal being inserted into the optical switch 20 in the prior art, a crosstalk into other paths was problematic. Therefore, during the path switchover, the optical signal to the optical switch 20 is intercepted by the optical switch element 13, thereby reducing the crosstalk.

Hereinafter, as shown in FIG. 1A, the operation procedure of switching over a path P2 established between an input port 3_64 and an output port 4_64 to a path P3 between the input port 3_64 and an output port 4_1 will be described referring to FIG. 1B. Steps S10 and S11: When receiving a path switchover request signal 80 from an operation system 41 (see FIG. 13), the controller 40 turns off the optical switch element 13_64 with a control signal 82 to intercept a passing optical signal.

Step S12: Then, the controller 40 requests the optical switch 20, with a switchover control signal 81, to switch over the path established between the input port 3_64 and the output port 4_64 to the path between the input port 3_64 and the output port 4_1.

The optical switch 20 controls the directions of an input movable mirror 24_64 and an output movable mirror 25_1 (both not shown) so that the optical signal from the input port 3_64 may be transmitted to the output port 4_1 through the input movable mirror 24_64 and the output movable mirror 25_1.

Step S13: In a predetermined time necessary for completing the operation of the movable mirror, the controller 40 turns on the optical switch element 13_64 by the control signal 82, and makes the optical signal pass to complete the path switchover.

Thus, the input optical signal is intercepted while the movable mirrors are moved so as to face the desired directions, and is inputted after the movable mirrors has faced the desired directions, thereby enabling a crosstalk during the path switchover to be eliminated.

Embodiment (2)

Figure 2A:
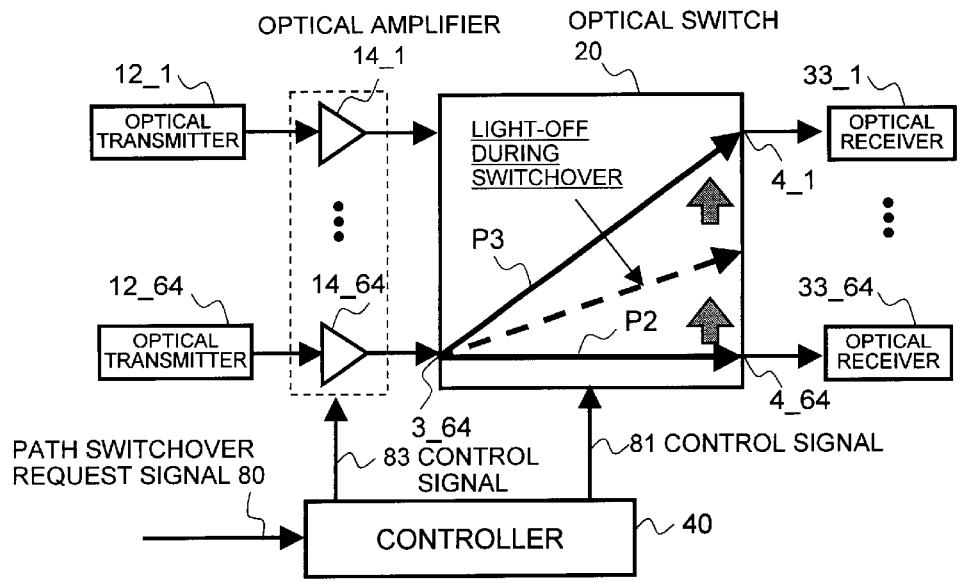
FIGS. 2A and 2B are block diagrams showing an embodiment (2) of an optical switch according to the present invention.
Figure 2B:
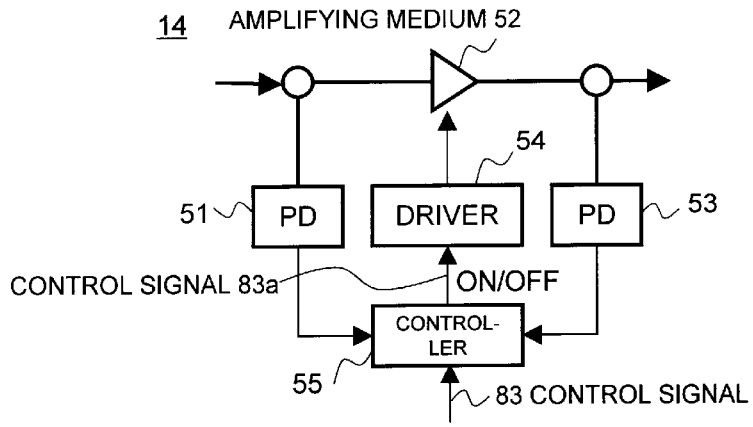
Figure 2C:
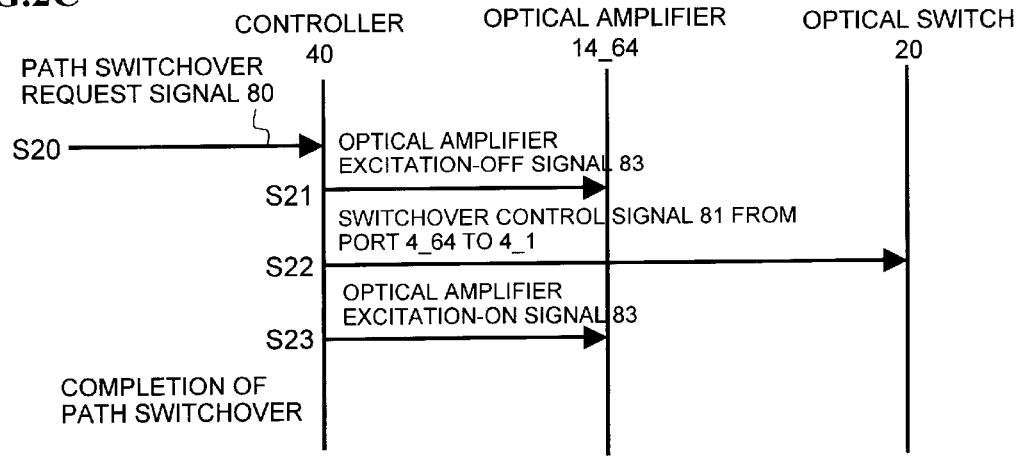
FIG. 2C is a sequence chart showing an embodiment (2) of an optical switch according to the present invention.

FIGS. 2A–2C show an embodiment (2) of the optical switch 20 according to the present invention. In the embodiment (2), as shown in FIG. 2A, optical amplifiers 14_1–14_64 (hereinafter, occasionally represented by a reference numeral 14) are inserted between the optical switch 20 and the optical transmitters 12_1–12_64 including the light sources. The optical amplifiers 14 and the controller 40 compose the interception means.

FIG. 2B shows an arrangement of the optical amplifier 14, which is composed of an amplifying medium 52 amplifying the optical signal, photodiodes (PD's) 51 and 53 respectively detecting the optical signals on the input side and the output side of the amplifying medium 52, a driver 54 driving the amplifying medium 52, and a controller 55 controlling the driver 54 based on the signals from the PD's 51 and 53 and a control signal 83.

Hereinafter, in the same way as the embodiment (1), the operation procedure in case where the optical signal from the input port 3_64 is switched over from the output port 4_64 to the output port 4_1 will be described referring to FIG. 2B and the sequence chart in FIG. 2C. Steps S20 and S21 (see FIG. 2C): When receiving the path switchover request signal 80 from the operation system 41, the controller 40 requests the optical amplifier 14_64, by an optical amplifier excitation-on/off control signal 83, to intercept the optical signal.

In FIG. 2B, the controller 55 of the optical amplifier 14_64 turns off the driver 54 by a control signal 83a, and makes the gain of the amplifying medium 52 substantially zero to intercept the optical signal.

Step S22: In the same way as step S12 in the embodiment (1), the controller 40 requests the path switchover by the switchover control signal 81, so that the optical switch 20 performs a path switchover control.

Step S23: In a predetermined time, the controller 40 requests the optical amplifier 14_64, by the optical amplifier excitation-on/off control signal 83, to amplify the optical signal.

The controller 55 of the optical amplifier 14_64 turns on the driver 54 by the control signal 83a, and returns the gain of the amplifying medium 52 to its original state to make the optical signal pass.

Thus, the crosstalk during the path switchover can be suppressed.

It is to be noted that the gain of the optical amplifier 14 is not always required to be made zero as mentioned above. Even when the optical signal outputted from the optical amplifier 14 assumes the crosstalk for other paths, the gain of the optical amplifier 14 has only to be lowered to the level which does not have an influence on the quality of the optical signals on the other paths.

Embodiment (3)

Figure 3A:
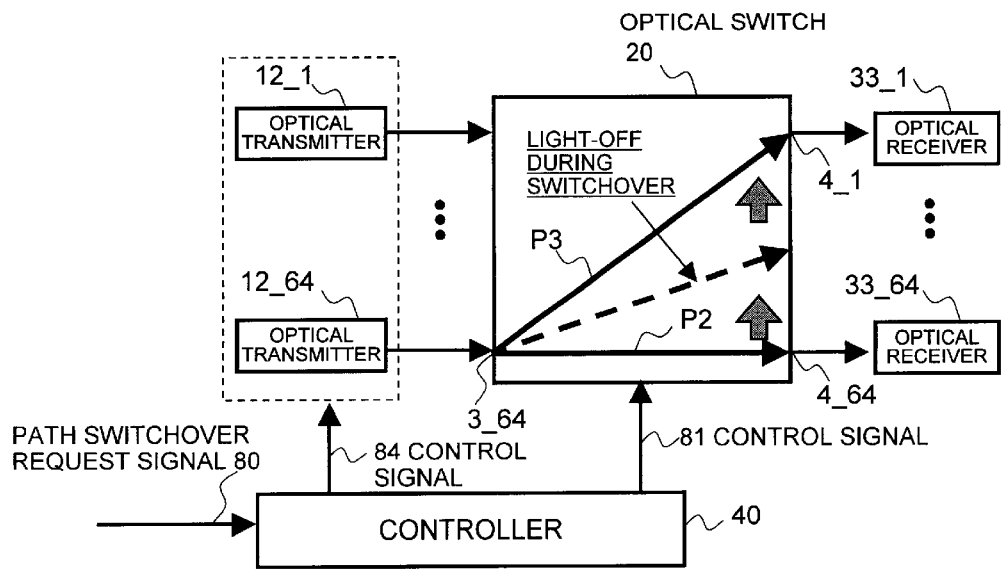
FIGS. 3A and 3B are block diagrams showing an embodiment (3) of an optical switch according to the present invention.
Figure 3B:
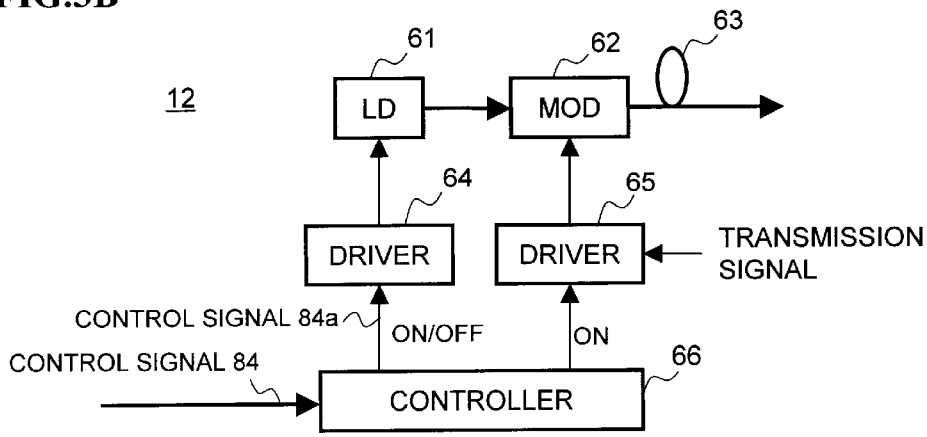
Figure 3C:
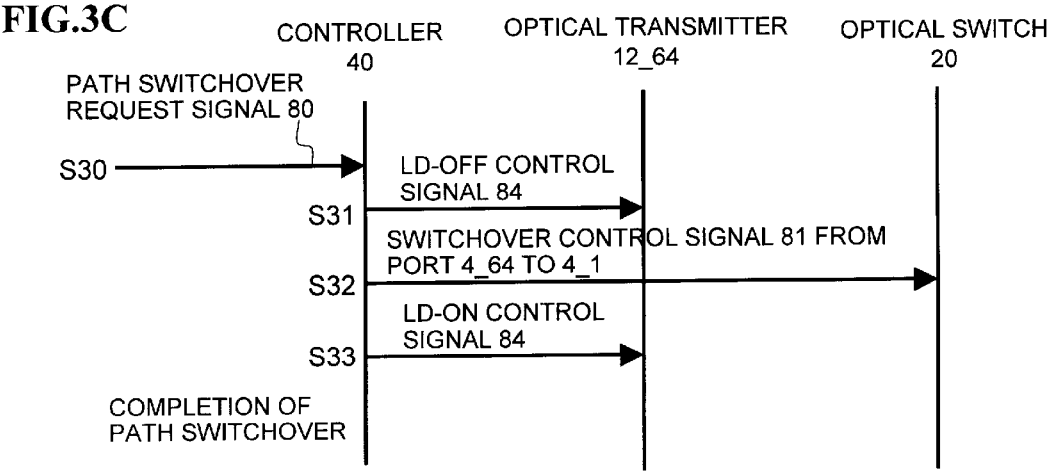
FIG. 3C is a sequence chart showing an embodiment (3) of an optical switch according to the present invention.

FIGS. 3A–3C show an embodiment (3) of the optical switch 20 according to the present invention. As shown in FIG. 3A, the optical transmitters 12_1–12_64 (hereinafter, occasionally represented by a reference numeral 12) including the light sources are respectively connected to the optical switch 20. In the embodiment (3), the controller 40 controlling the light sources in the optical transmitters 12 and the optical transmitters 12 compose the interception means.

As shown in FIG. 3B, the optical transmitter 12 is composed of a laser diode (LD) 61 which is a light source, a driver 64 thereof, a modulator (MOD) 62 modulating the light from the LD 61, a driver 65 thereof, and a controller 66 controlling the drivers 64 and 65 based on a control signal 84.

Hereinafter, in the same way as the embodiment (1), the operation procedure in case where the optical signal from the input port 3_64 is switched over from the output port 4_64 to the output port 4_1 will be described referring to FIG. 3C.

Steps S30 and S31: When receiving the path switchover request signal 80 from the operation system 41, the controller 40 requests the optical transmitter 12_64, by an LD-on/off control signal 84, to turn off the LD 61.

The controller 66 of the optical transmitter 12_64 turns off the driver 64 with a control signal 84a to stop the light emission of the LD 61, thereby intercepting the optical signal outputted from the optical transmitter 12.

Step S32: In the same way as step S12 of the embodiment (1), the controller 40 requests the path switchover by the switchover control signal 81, so that the optical switch 20 performs the path switchover control.

Step S33: In a predetermined time, the controller 40 requests the optical transmitter 12_64, with the LD-on/off control signal 84, to turn on the LD 61.

The controller 66 starts the light emission of the LD 61 by turning on the driver 64 with the control signal 84a. Thus, the optical signal is outputted from the optical transmitter 12.

It is to be noted that the embodiment (3) can be also applied to the optical transmitter of a direct modulation method which modulates the driving current of the LD 61 itself.

Embodiment (4)

Figure 4A:
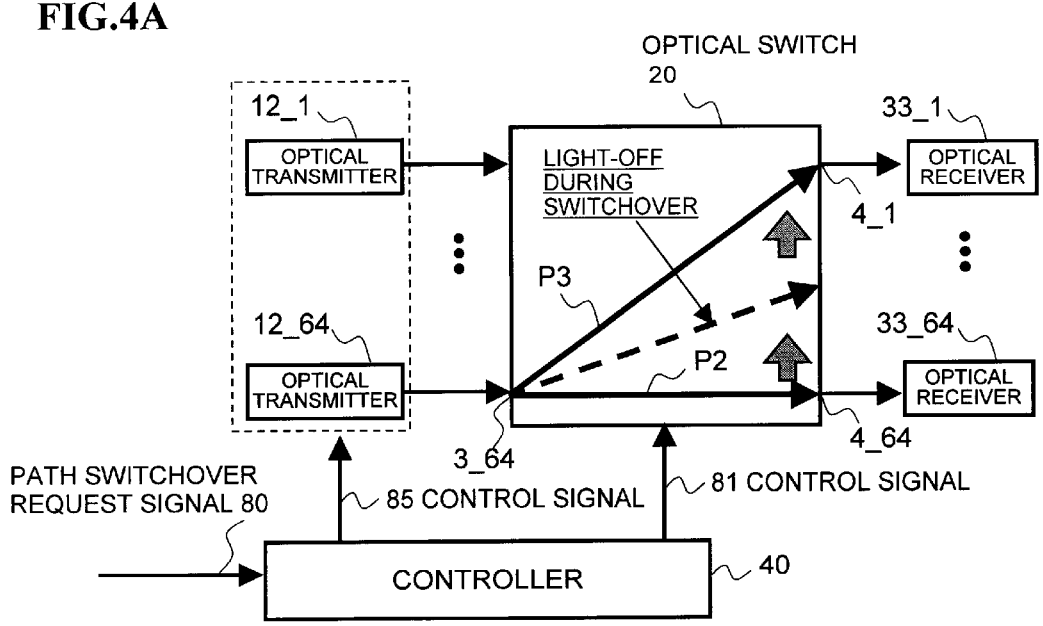
FIGS. 4A and 4B are block diagrams showing an embodiment (4) of an optical switch according to the present invention.
Figure 4B:
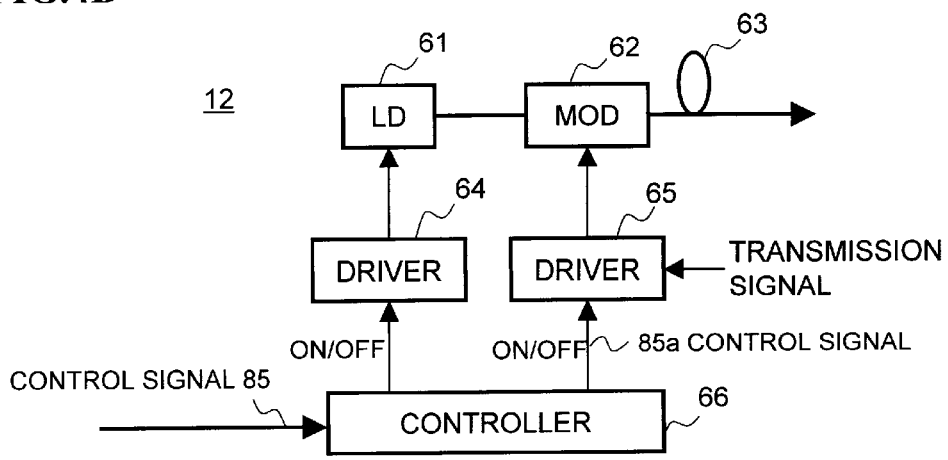
Figure 4C:
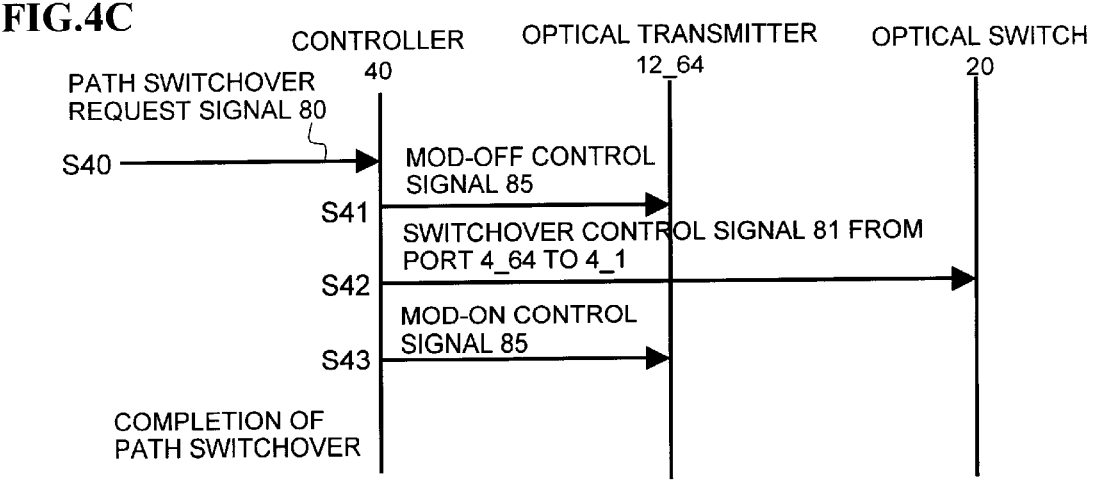
FIG. 4C is a sequence chart showing an embodiment (4) of an optical switch according to the present invention.

FIGS. 4A–4C show an embodiment (4) of the optical switch 20 according to the present invention. In the embodiment (4), different from the embodiment (3), not the LD 61 of the optical transmitter 12 but the MOD 62 is controlled. The basic arrangements of FIGS. 4A–4C are respectively the same as those of FIGS. 3A–3C.

Hereinafter, in the same way as the embodiment (3), the operation procedure in case where the optical signal from the input port 3_64 is switched over from the output port 4_64 to the output port 4_1 will be described referring to FIG. 4C.

Steps S40 and S41: When receiving the path switchover request signal 80 from the operation system 41, the controller 40 requests the optical transmitter 12_64, by an MOD-on/off control signal 85, to turn off a modulation operation of the MOD 62.

The controller 66 of the optical transmitter 12_64 turns off the driver 65 by a control signal 85a, and stops the modulation of the MOD 62 to make the level of the output optical signal zero. Thus, the optical signal outputted from the optical transmitter 12 is intercepted. Step S42: In the same way as step S32 of the embodiment (3), the controller 40 requests the path switchover by the switchover control signal 81, so that the optical switch 20 performs the path switchover control.

Step S43: In a predetermined time, the controller 40 requests the optical transmitter 12_64 to turn on the MOD 62 with the MOD-on/off control signal 85.

The controller 66 restarts the modulation of the MOD 62 by turning on the driver 65 with the control signal 85a. Thus, the optical signal is outputted from the optical transmitter 12.

The embodiment (4) is applied to the case of an external modulation method which modulates a light by a modulator.

It is to be noted that in the same way as the case of the optical amplifier 14 in the embodiment (2), the level of the optical signal has only to be lowered, by the controller 66, to the level which does not have an influence on the quality of the optical signals on other paths, even when the optical signal outputted from the optical transmitter 12 assumes the crosstalk for other paths.

Embodiment (5)

Figure 5A:
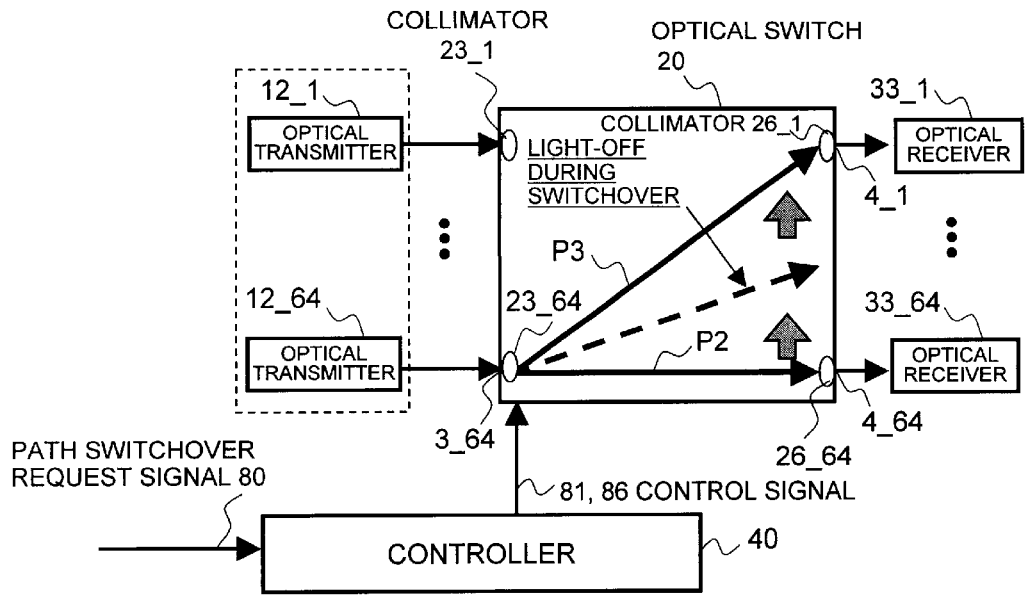
FIGS. 5A and 5B are block diagrams showing an embodiment (5) of an optical switch according to the present invention.
Figure 5B:
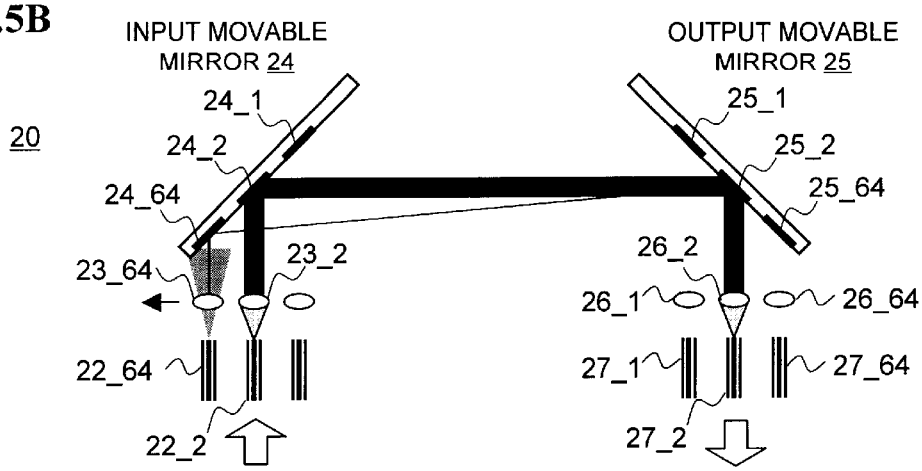
Figure 5C:
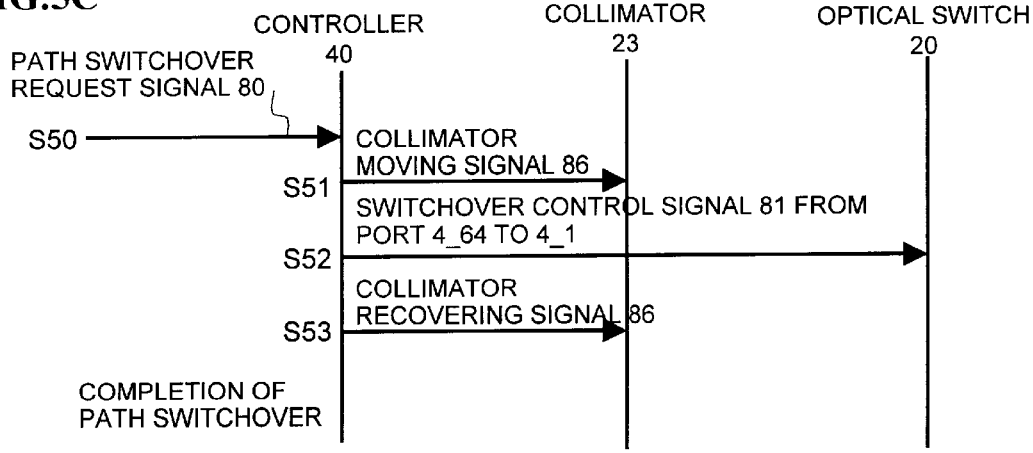
FIG. 5C is a sequence chart showing an embodiment (5) of an optical switch according to the present invention.

FIGS. 5A–5C show an embodiment (5) of the optical switch 20 according to the present invention. Collimators 23_1–23_64 and 26_1–26_64, which are not shown in FIGS. 1A–4A of the embodiments (1)–(4) for convenience sake, are respectively arranged in the input ports and the output ports of the optical switch 20 shown in FIG. 5A.

In the embodiment (5), a collimator controller (=interception means, not shown) included in the controller 40 controls the position of the collimator, shifts the focus, and scatters the optical signal within the optical switch 20, so that the optical signal is substantially intercepted.

Hereinafter, in the same way as the embodiment (1), the operation procedure in case where the optical signal from the input port 3__64 is switched over from the output port 4__64 to the output port 4__1 will be described referring to FIGS. 5B and 5C.

Steps S50 and S51: When receiving the path switchover request signal 80 from the operation system 41, the controller 40 shifts the position of the collimator 23__64 corresponding to the optical transmitter 12__64, with a control signal 86, from a predetermined position by an electrostatic actuator (not shown) and the like, and scatters the light (see FIG. 5B), so that the optical signal from the optical transmitter 12__64 is substantially made intercepted.

Step S52: In the same way as step S12 of the embodiment (1), the controller 40 requests the path switchover by the switchover control signal 81, so that the optical switch 20 performs the path switchover control.

Step S53: In a predetermined time, the controller 40 returns the position of the collimator 23__64 to its original state by the control signal 86 to complete the path switchover.

Embodiment (6)

Figure 6A:
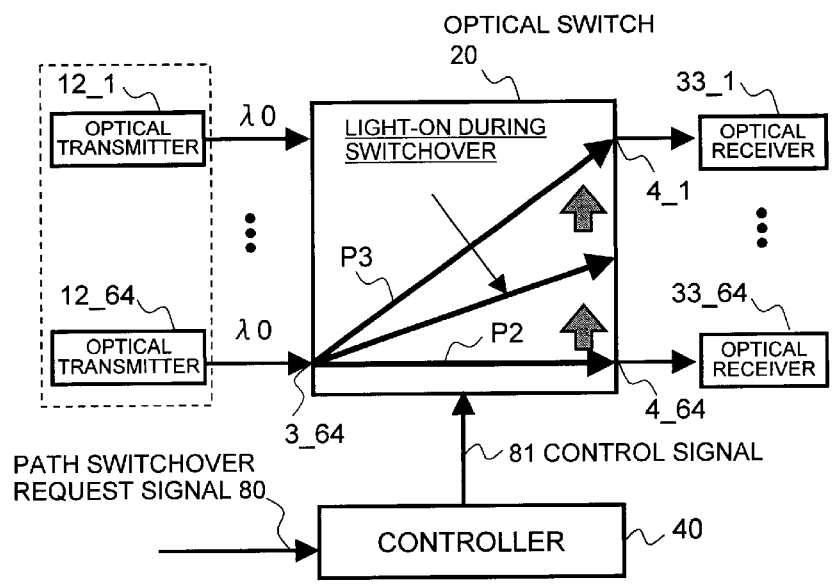
FIGS. 6A and 6B are block diagrams showing an embodiment (6) of an optical switch according to the present invention.
Figure 6B:
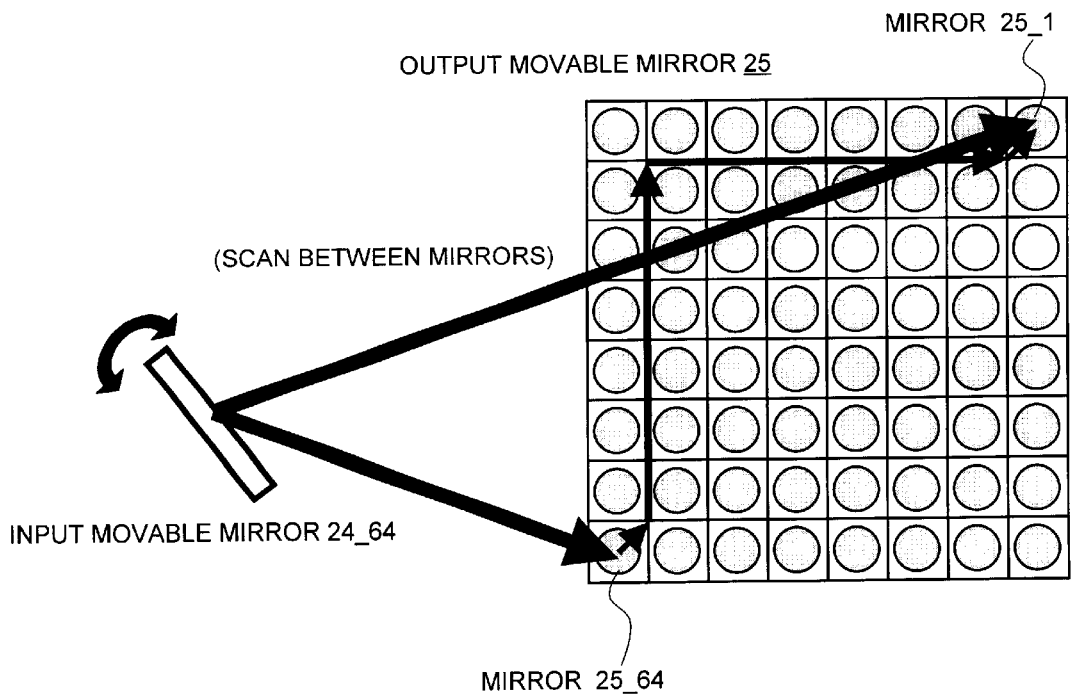

FIGS. 6A and 6B show an embodiment (6) of the optical switch 20 according to the present invention. In the embodiment (6), the optical signal is not intercepted during the path switchover, but is scanned without being irradiated to the output movable mirrors.

Figure 17:
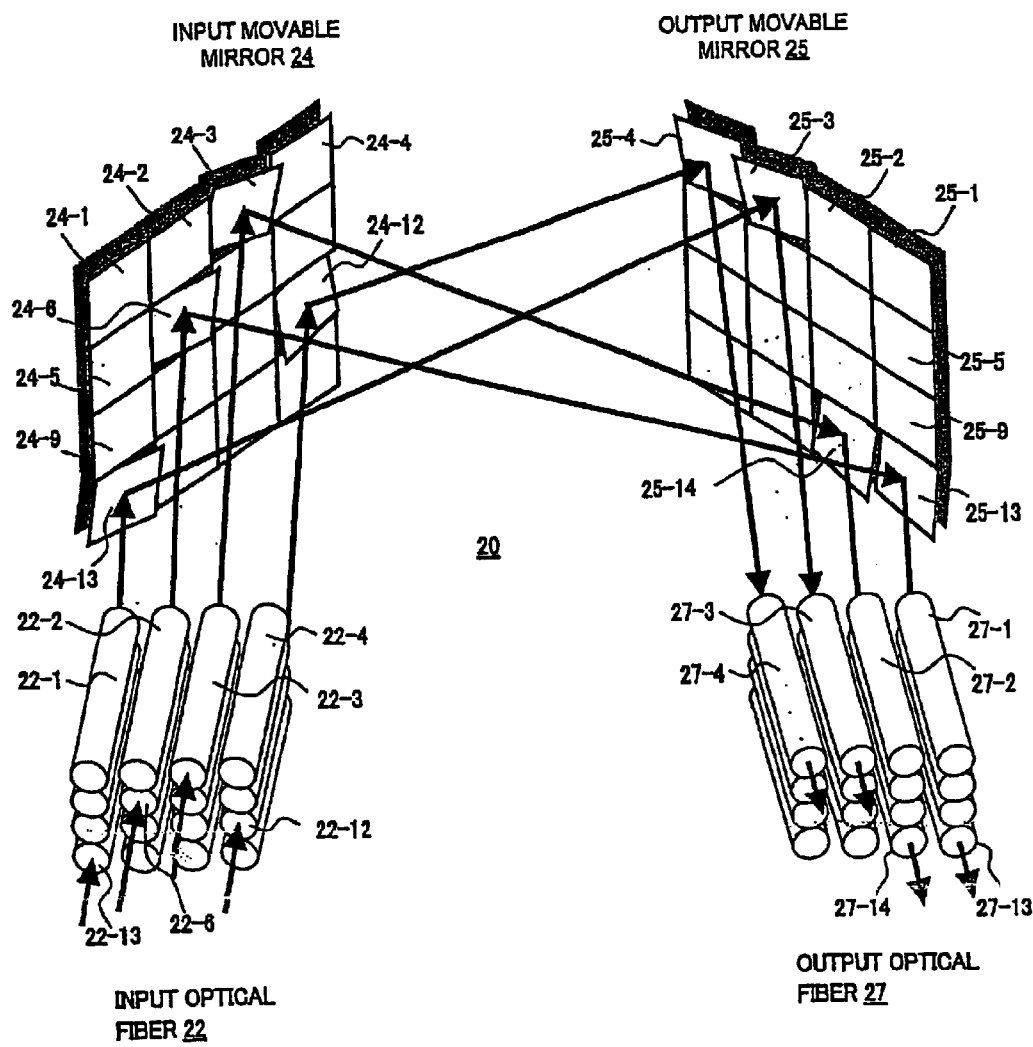
FIG. 17 is a block diagram showing an arrangement of a general 3D mirror-type optical switch.

As shown in FIG. 6A, an arrangement of an optical switch apparatus 100 including the optical switch according to the present invention is the same as that of the prior art optical switch apparatus 100, while the controller 40 controls, during the path switchover, the optical signal reflected from the input movable mirror 24 (see FIG. 17) so as not to be irradiated to the output movable mirror 25 with the control signal 81.

Hereinafter, in the same way as the embodiment (1), the operation procedure in case where the optical signal from the input port 3__64 is switched over from the output port 4__64 to the output port 4__1 will be described referring to FIG. 6B.

Before the path switchover, the optical signal from the optical transmitter 12__64 is firstly deflected (reflected) to the output movable mirror 25__64 through the input movable mirror 24__64.

When receiving the path switchover request signal 80 from the operation system 41, the controller 40 moves the destination of a deflection from the output movable mirror 25__64 finally to the output movable mirror 25__1 through the gap (see thick arrow in FIG. 6B) of the output movable mirrors, so that the path switchover is completed Thus, during the path switchover, the optical signal deflected at the input movable mirror 24__64 is not deflected to the output movable mirrors, so that the crosstalk which occurs upon the path establishment and the path switchover can be eliminated.

Embodiment (7)

Figure 7A:
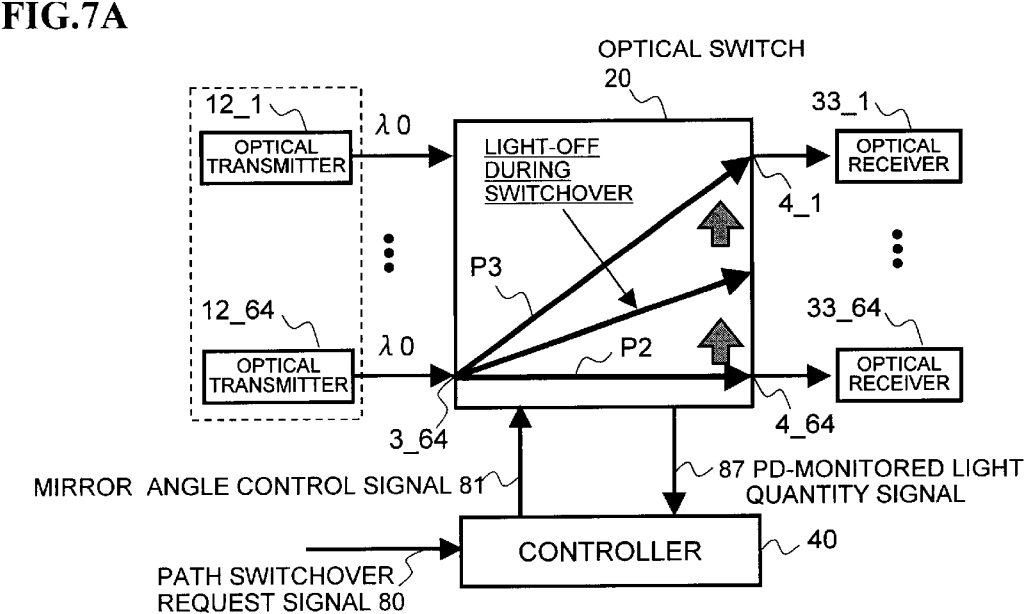
FIGS. 7A and 7B are block diagrams showing an embodiment (7) of an optical switch according to the present invention.
Figure 7B:
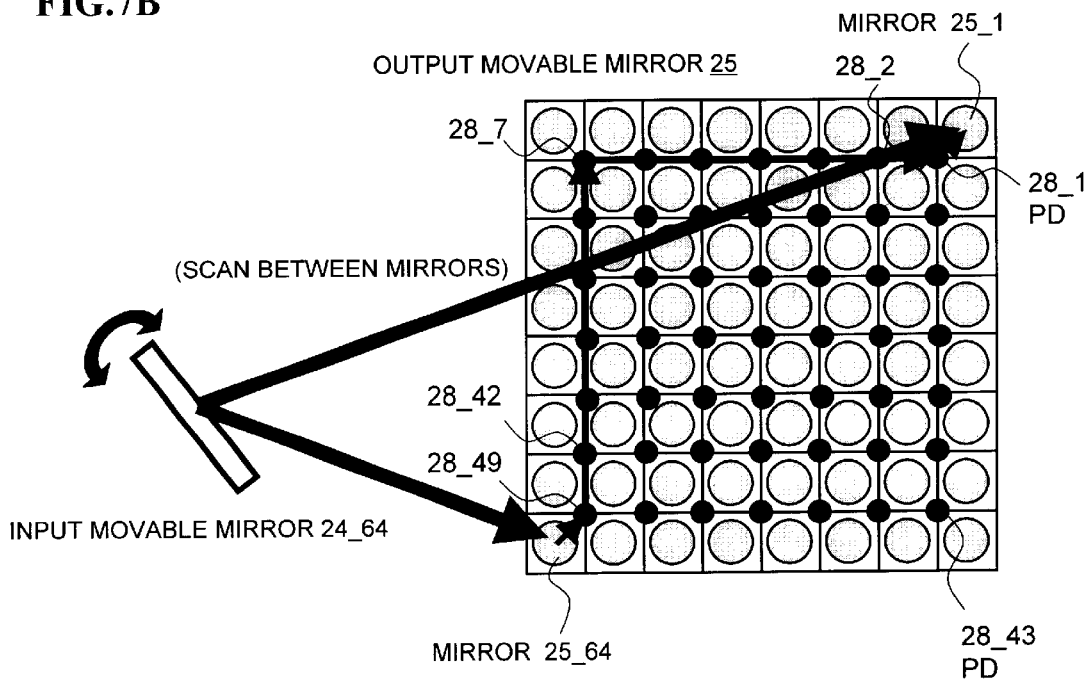

FIGS. 7A and 7B show an embodiment (7) of the optical switch 20 according to the present invention. In the embodiment (7), in the same way as the embodiment (6), the optical signal is not intercepted but is scanned without being irradiated to the output movable mirrors, during the path switchover.

The embodiment (7) is different from the embodiment (6) in that photodevices (PD's) 28__1–28__49 are arranged between the output movable mirrors 25__1–25__64 as shown in FIG. 7B and the optical power quantity received by the PD's 28__1–28__49 is provided to the controller 40 by a PD-monitored light quantity signal 87.

Hereinafter, in the same way as the embodiment (6), the operation procedure in case where the optical signal from the input port 3__64 is switched over from the output port 4__64 to the output port 4__1 will be described referring to FIG. 7B.

Before the switchover, the optical signal from the optical transmitter 12__64 is firstly deflected to the output movable mirror 25__64 by the input movable mirror 24__64.

When receiving the path switchover request signal 80 from the operation system 41, the controller 40 moves the destination of the deflection from the output movable mirror 25__64 finally to the output movable mirror 25__1 through the gap (see thick arrow in FIG. 7B) of the output movable mirrors, so that the path switchover is completed.

During the path switchover, the controller 40 monitors the optical signal by the PD's 28__1–28__49 to perform a feedback control so as to prevent the optical signal from being shifted from the gap of the output movable mirrors 25.

Embodiment (8)

Figures 8A, 8B:
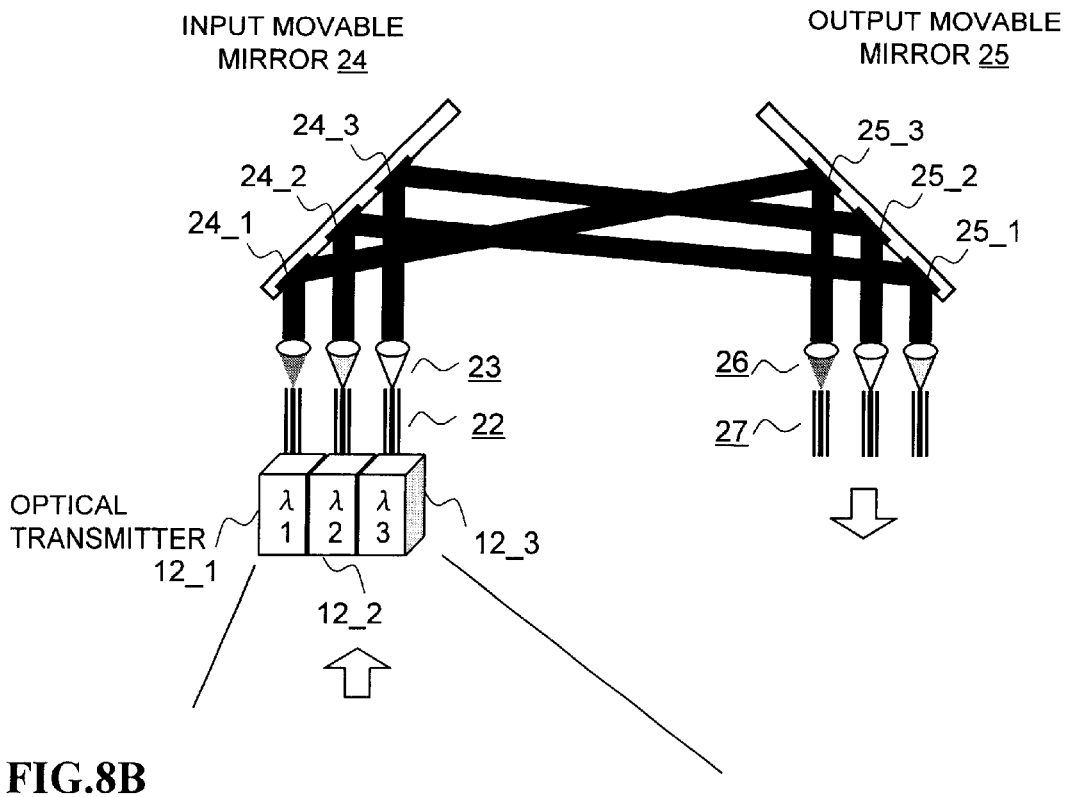
FIGS. 8A and 8B are block diagrams showing an embodiment (8) of an optical switch according to the present invention.

FIGS. 8A and 8B show an embodiment (8) of the optical switch 20 according to the present invention. The embodiment (8) is an example of suppressing a coherent crosstalk from an adjoined path.

As described in FIGS. 19A–19C, the crosstalk assumes the maximum when it is received from the path through the mirror adjoined. Also, especially when the wavelengths are same and the phases coincide with each other, the crosstalk assumes the coherent crosstalk, and has a significant influence on the signal. Therefore, to avoid the coherent crosstalk is important.

Figure 14:
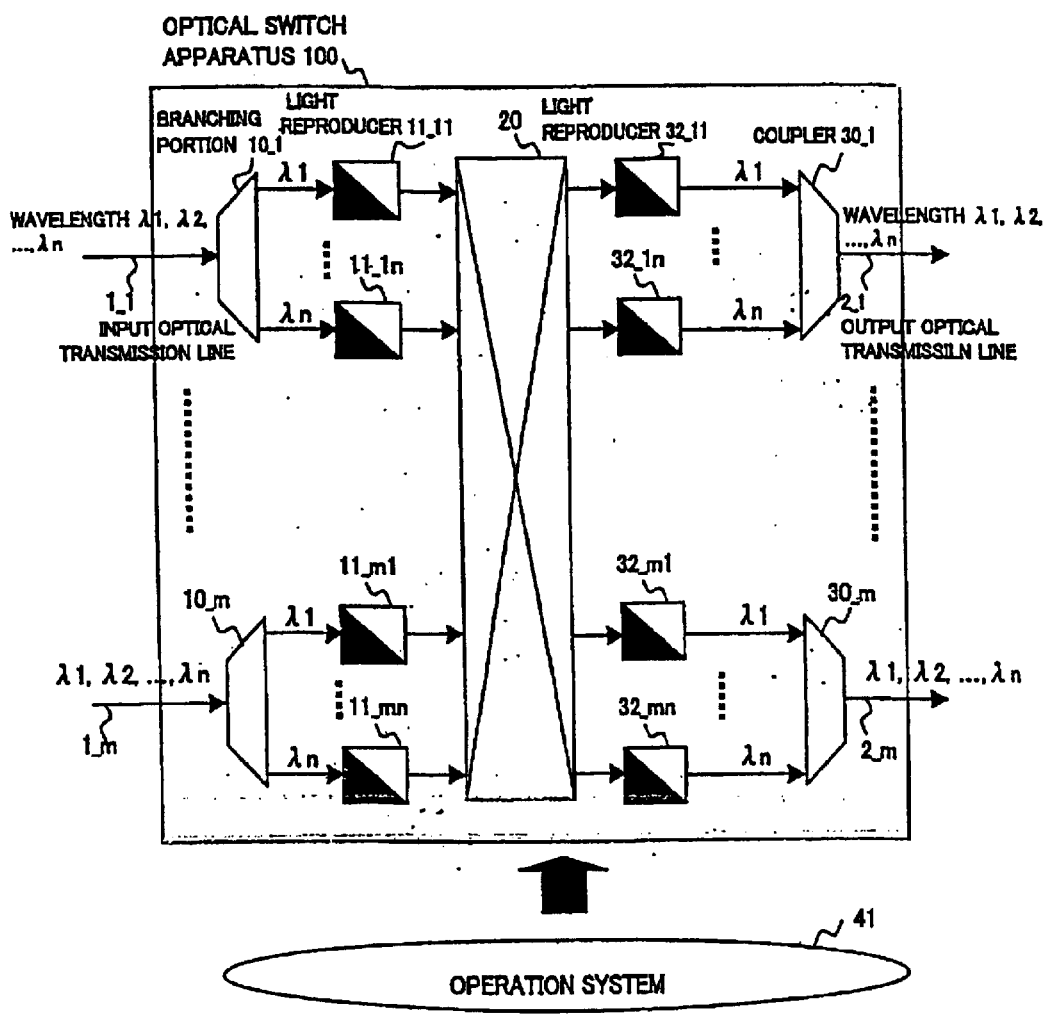
FIG. 14 is a block diagram showing an arrangement (2) of an optical switch apparatus including a general optical switch.
Figure 16:
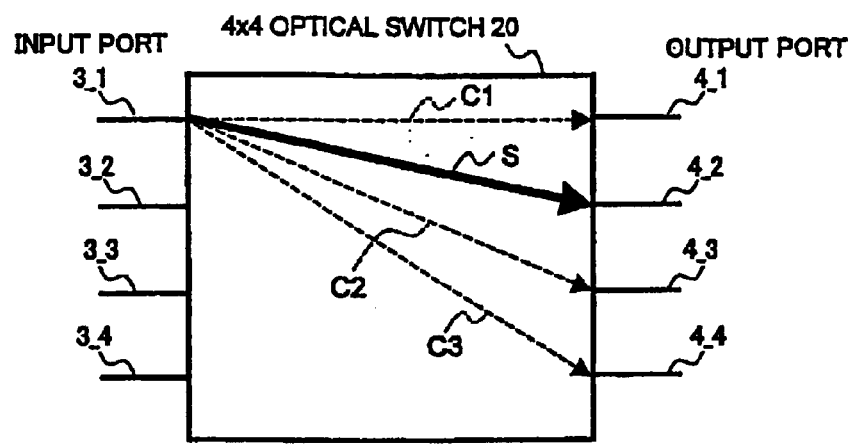
FIG. 16 is a block diagram showing an example (1) of a crosstalk in a general optical switch.
Figure 18:
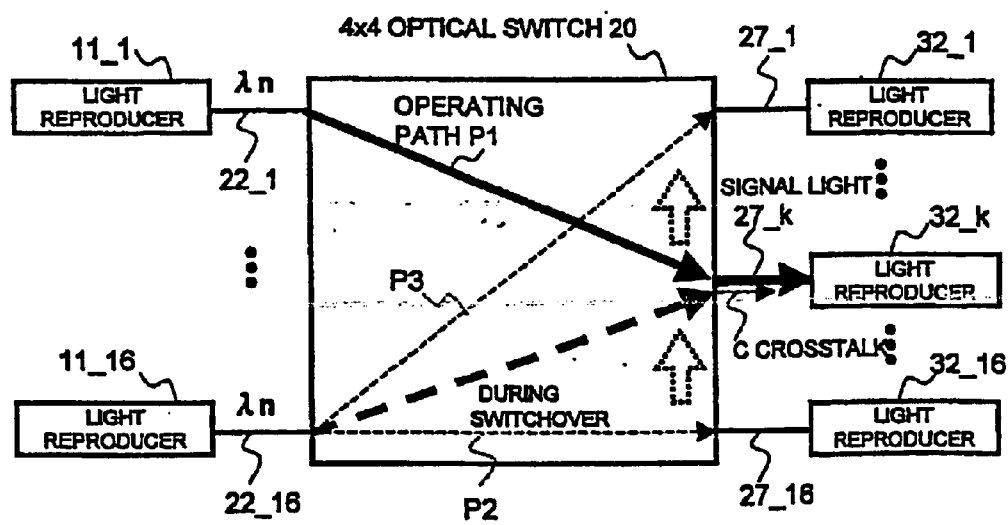
FIG. 18 is a block diagram showing an example (2) of a crosstalk which occurs upon a path switchover in a general optical switch.

In the optical cross-connect to perform a light reproduction shown in FIG. 14, the input movable mirrors 24 (not shown) included in the routing portion 20 correspond to light source optical transmitters 12 (not shown) respectively included in the light reproducers 11__11–11__mn in a one-to-one relationship. Therefore, as shown in FIG. 8A, the wavelengths of the optical transmitters 12__1 and 12__2 respectively corresponding to the input movable mirror 24__1 and the adjoined input movable mirror 24__2 for example are set to different wavelengths $\lambda 1$ and $\lambda 2$.

FIG. 8B shows an example of the wavelength set in the optical transmitter 12 in a 64 input ×64 output optical switch 20. The wavelengths $\lambda 1, \lambda 2, \lambda 3, \ldots, \lambda 2$ are respectively set in the optical transmitters 12__1, 12__2, 12__3, . . . , 12__64.

According to FIG. 8B, the wavelengths of the optical transmitters 12 which adjoin the optical transmitters 12 whose wavelength is $\lambda 1$ are only $\lambda 2, \lambda 3, \lambda 4$, without the transmitters 12 of $\lambda 1$ adjoined by no means.

Since the optical transmitters 12 set to the wavelengths $\lambda 2, \lambda 3$, and $\lambda 4$ have the same arrangement pattern as that of the optical transmitters 12 whose wavelength is $\lambda 1$, the optical transmitters having the same wavelength never adjoin.

Accordingly, at least four kinds of light sources having different wavelengths are required. Thus, the coherent crosstalk from the adjoined path can be avoided.

Embodiment (9)

Figures 9A, 9B:
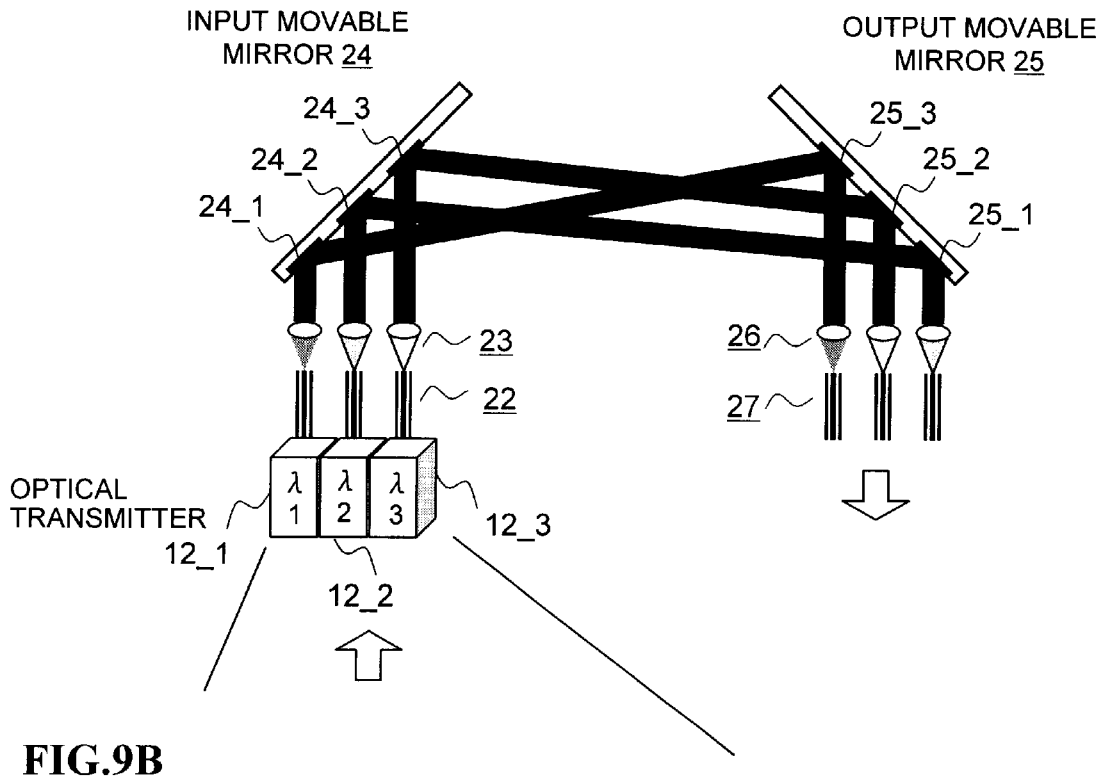
FIGS. 9A and 9B are block diagrams showing an embodiment (9) of an optical switch according to the present invention.

FIGS. 9A and 9B show an embodiment (9) of the optical switch 20 according to the present invention. The embodiment (9) is an example of suppressing the coherent crosstalk from not only the adjoined path but also the path which further adjoins the adjoined path.

In FIG. 9A, the wavelength λ2 of the optical transmitter 12_2 which adjoins the optical transmitter 12_1 and the wavelength λ3 of the optical transmitter 12_3 which adjoins the optical transmitter 12_2 are set different from the wavelength λ1 of the optical transmitter 12_1.

FIG. 9B shows an example of the wavelengths set in the optical transmitters 12_1–12_64 corresponding to the 64 input×64 output optical switch 20. The wavelengths λ1, λ2, λ3, . . . λ64 are respectively set in the optical transmitters 12_1, 12_2, 12_3, . . . 12_64.

According to FIG. 9B, the wavelength of the optical transmitter 12 which adjoins the optical transmitter 12 having the wavelength λ1, and the wavelength of the optical transmitter 12 which adjoins the former optical transmitter 12 are only λ2–λ9, not λ1.

Since the optical transmitters 12 set to the wavelengths λ2–λ9 have the same arrangement pattern as that of the optical transmitter 12 having the wavelength λ1, no adjoined optical transmitters 12 have the same wavelength, and no optical transmitters 12 which adjoin the former optical transmitters 12 have the same wavelength.

Accordingly, at least nine kinds of light sources having different wavelengths are required. Thus, the coherent crosstalk from the adjoined path and the path which adjoins the adjoined path can be avoided.

In the above-mentioned embodiments, the distance between two output movable mirrors according to the path switchover is not especially considered. In case of the embodiment (7) in FIGS. 7A and 7B for example, there are many movable mirrors between the movable mirrors 25_64 and 24_1, thereby increasing the possibility of the crosstalk upon the switchover.

Therefore, in consideration of such a case, an example of a path switchover of the optical switch apparatus including the optical switch 20 which can reduce the crosstalk upon the switchover will be described referring to FIGS. 10A and 10B.

Figure 13:
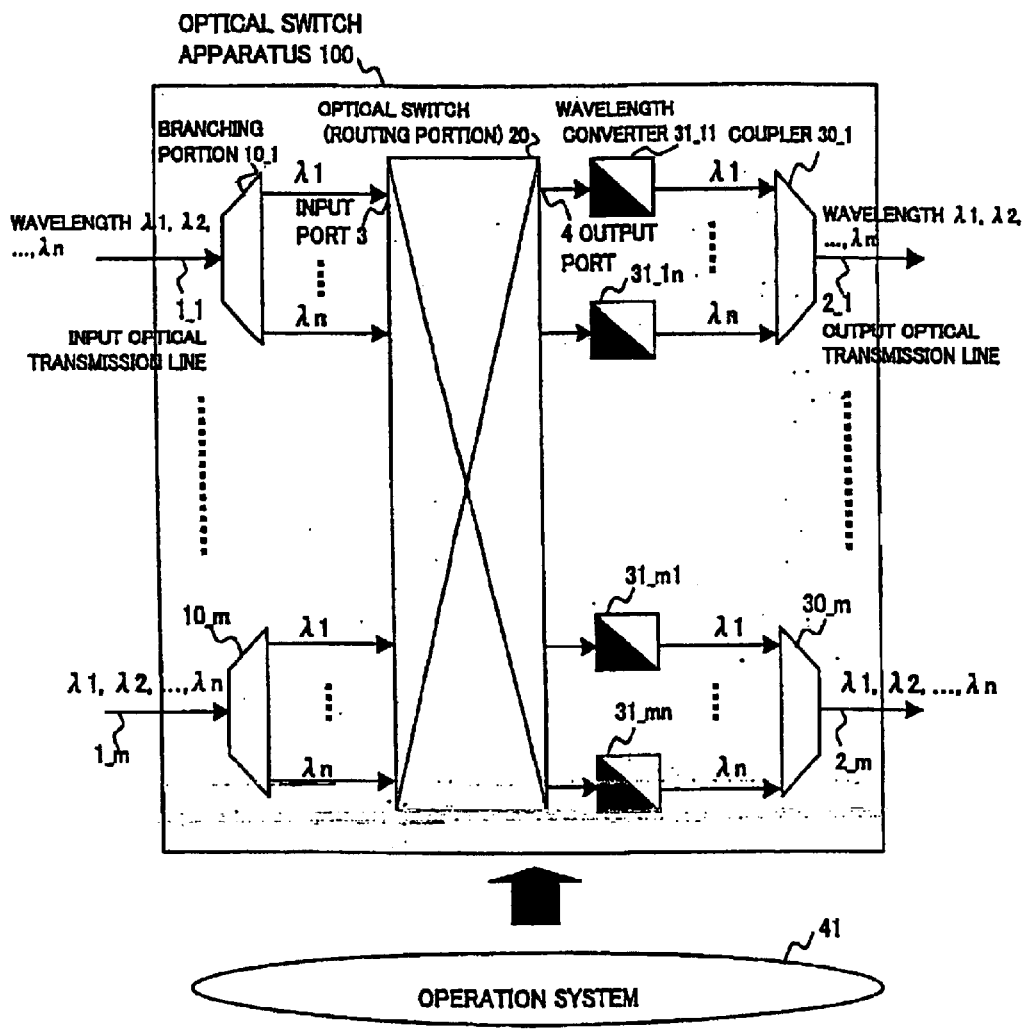
FIG. 13 is a block diagram showing an arrangement (1) of an optical switch apparatus including a general optical switch.

FIGS. 10A and 10B show an example of a general path switchover in case where a fault occurs on an output optical transmission line 2_3 in the optical switch apparatus 100 shown in FIG. 13.

FIG. 10A shows a path establishment state before a fault occurrence, where the optical signal of an input optical transmission line 1_1 having the wavelength λ1, the optical signal of an input optical transmission line 1_3 having the wavelength λ1, and the optical signal of an input optical transmission line 1_4 having the wavelength λ4 are respectively converted into the wavelengths λ2, λ4, λ1 by wavelength converters 31_10, 31_12, and 31_9 to be outputted to the output optical transmission line 2_3. The optical signal of the input optical transmission line 1_3 having the wavelength λ3 is outputted to the output optical transmission line 2_3 without converting the wavelength.

FIG. 10B shows a state after the path switchover upon occurrence of a fault on the output optical transmission line 2_3. Namely, the optical signals are bypassed to other output optical transmission lines 2_1, 2_2, and 2_4.

In this path switchover example, the optical signal of the input optical transmission line 1_1 having the wavelengths λ1, the optical signal of the input optical transmission line 1_3 having the wavelength λ1, and the optical signal of the input optical transmission line 1_4 having the wavelength λ4 are respectively converted into the wavelengths λ2, λ4, λ1 at wavelength converters 31_6, 31_4, and 31_13 to be outputted to the output transmission lines 2_2, 2_1, and 2_4. The optical signal of the input optical transmission line 1_3 having the wavelength λ3 is outputted to the output optical transmission line 2_4 without converting the wavelength.

Namely, the wavelength converter 31, i.e. the output optical transmission line 2 is selected so that the wavelengths of the output optical signals on the output optical transmission line after the fault may assume the same as the wavelengths of the output optical signals before the fault.

Following embodiments (10) and (11) are the embodiments where the crosstalk which occurs during the path switchover is eliminated in case where the path switchover as mentioned above is performed.

Embodiment (10)

Figure 11A:
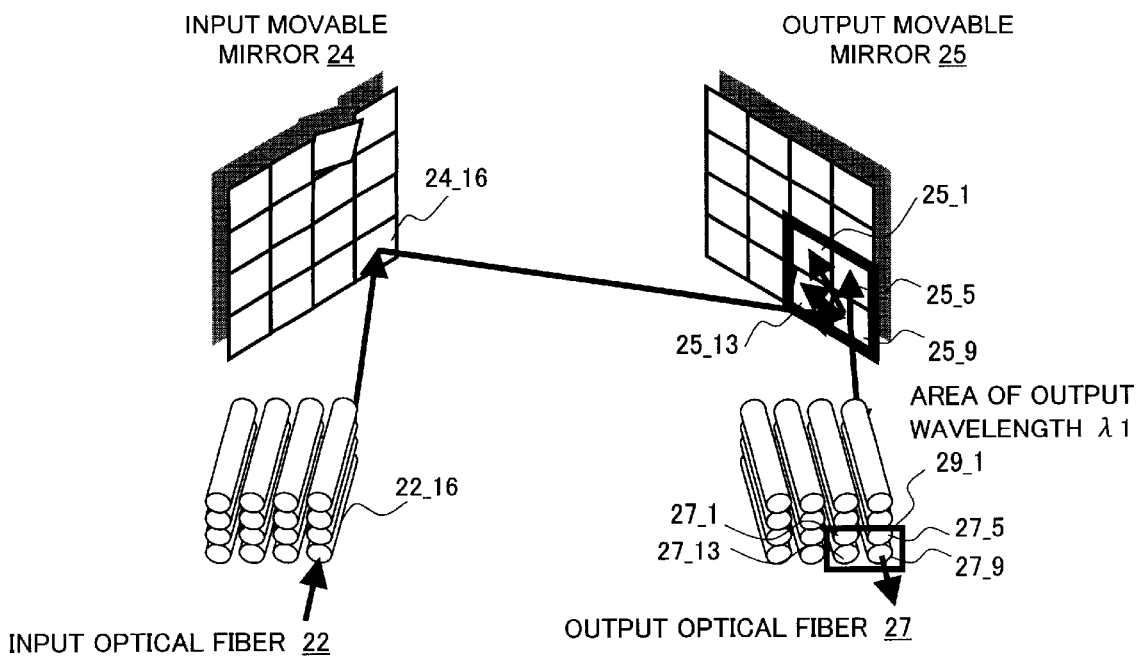
FIGS. 11A and 11B are block diagrams showing an embodiment (10) of an optical switch according to the present invention.
Figure 11B:
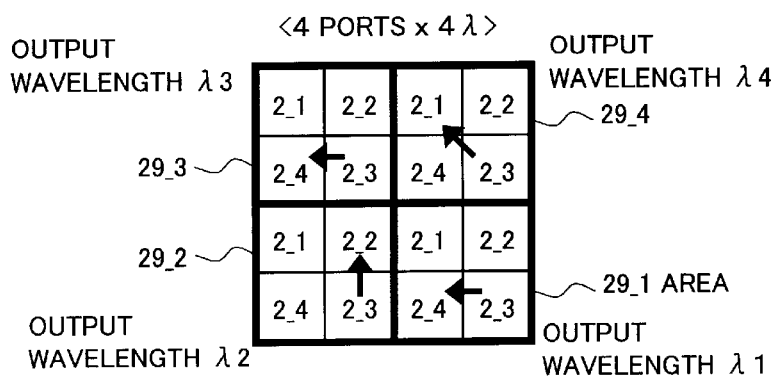

FIGS. 11A and 11B show an embodiment (10) of the optical switch 20 according to the present invention. This embodiment (10) reduces the crosstalk by devising the arrangement of the movable mirrors.

FIG. 11A shows a case where the 16 input×16 output optical switch 20 shown in FIGS. 10A and 10B is applied to the present embodiment, where output optical fibers 27_1, 27_5, 27_9, and 27_13 (see FIGS. 10A and 10B) for example, are arranged together in a single area 29_1. Accordingly, the output movable mirrors 25_1, 25_5, 25_9, and 25_13 corresponding to the output optical fibers 27_1, 27_5, 27_9, and 27_13 are also arranged together in a single area.

The optical signals which pass through the output optical fibers 271, 27_5, 27_9, and 27_13 in the area 29_1 are converted into the same wavelength λ1 at the wavelength converters 31_1, 31_5, 31_9, and 31_13 at the subsequent stage (see FIG. 11A).

Similarly, at the wavelength converters at the subsequent stage, the output optical fibers 27 (accordingly, output movable mirrors 25 corresponding thereto) through which the optical signals converted into the wavelengths λ2–λ4 pass are respectively arranged together in areas 29_2–29_4.

FIG. 11B shows an arrangement example of the output optical fibers 27 thus arranged. Reference numerals 2_1–2_4 in FIG. 11B indicate the reference numerals of the output optical transmission lines 2.

In FIG. 11A, as shown in FIG. 10A, the wavelength of the optical signal inputted from the input optical fiber 22_16, before the fault of the output optical transmission line 2_3, for example, is converted into λ1 at the wavelength converter 31_9 through the input movable mirror 24_16, the output movable mirror 25_9, and the output optical fiber 27_9.

After the fault of the output optical transmission line 2_3, the wavelength of the optical signal is converted into the same wavelength λ1 by the wavelength converter 31_13 through the input movable mirror 24_16, the output movable mirror 25_13, and the output optical fiber 27_13.

At this time, as shown in FIG. 11A, the optical signal deflected at the movable mirror 24_16 is moved from the movable mirror 25_9 to the movable mirror 25_13 in the same area 29_1, but does not cross the other movable mirrors 25 (see arrows in FIG. 11B). Namely, the path switchover can be performed without crosstalk occurrence.

Similarly, as shown in FIG. 11B, the other optical signals enables the path switchover without crossing (see arrows) the other movable mirrors within the areas 29_2–29_4.

Accordingly, when the number of the ports (optical fibers) corresponding to the output optical transmission lines 2 is equal to or less than 4, it is found that only the move of the optical signals within the areas 29_1–29_4 has to be considered in order to suppress the crosstalk during the path switchover.

Embodiment (11)

FIGS. 12A–12D show an embodiment (11) of the optical switch 20 according to the present invention. The embodiment (11), in the same way as the embodiment (10), separates the output movable mirrors 25 into areas per output wavelength to reduce the crosstalk.

While in the embodiment (10), the number of the output ports (optical fibers) corresponding to the output optical transmission lines 2 has to be equal to or less than 4, the embodiment (11) indicates the case where the number is extended to equal to or more than 5 output ports.

It is to be noted that the arrows in FIGS. 12A–12D indicate the case where the output port is switched over from the output port corresponding to the output optical transmission line 2_1 to the output port corresponding to the output optical transmission line 2_4.

In case that the number of the output ports corresponding to the output optical transmission lines 2 is 5–8, as shown in FIG. 12A, a single central mirror is made for an idle port. When the path is switched over to other paths except the adjoined path, the path is once deflected to the central mirror, and then deflected to the desired mirror.

In case that the number of the output ports corresponding to the output optical transmission lines 2 is 9–12, as shown in FIG. 12B, four central mirrors are made for an idle port. When the path is switched over to other paths except the adjoined path, the path is once deflected to the nearest idle mirror, and then deflected to the desired mirror.

In case that the number of the output ports corresponding to the output optical transmission lines 2 is 13–20, as shown in FIG. 12C, a single central mirror and four mirrors which respectively adjoin the central mirror diagonally are made for an idle port. When the path is switched over to other paths except the adjoined path, the path is once deflected to the nearest idle mirror, and then deflected to the desired mirror directly or through further deflection by another idle mirror.

In case that the number of the output ports corresponding to the output optical transmission lines is 21–28, as shown in FIG. 12D, four central mirrors and four mirrors which respectively adjoin the central mirror diagonally are made for an idle port. When the path is switched over to other paths except the adjoined path, the path is once deflected to the nearest idle mirror, and then deflected to the desired mirror directly or through further deflection by one or more idle mirrors.

Thus, since the signal light does not cross the mirrors of the other paths within the area during the switchover upon the occurrence of the transmission line fault, the crosstalk can be suppressed.

Also, the direction of the idle mirror is preliminarily fixed so as to prevent the optical signal deflected by the idle mirror from irradiating the output port.

As described above, an optical switch according to the present invention is arranged such that interception means such as an optical switch element, an optical amplifier, a controller for turning on/off a light source of an optical signal, an optical modulator, a collimator controller, intercept the optical signal inputted to the optical switch during a path switchover. Therefore, a crosstalk caused by the optical signal upon a path establishment or the path switchover can be eliminated.

Also, the optical switch according to the present invention is arranged so as to prevent optical signals deflected by movable mirrors, during a path switchover, from being outputted to all of the output ports except an output port for a new path establishment, e.g. so as for a movable mirror-type optical switch controller to control input movable mirrors, during the path switchover, so that optical signals reflected by the input movable mirrors may not be entered into output movable mirrors except an output movable mirror necessary for a new path establishment. Therefore, the crosstalk caused by the optical signal upon the path establishment or the path switchover is similarly eliminated.

Also, the optical switch according to the present invention is arranged such that wavelengths of the optical signals entered into the input movable mirrors of the movable mirror-type optical switch are different from those of the optical signals entered into the input movable mirrors adjoined, or the wavelengths of the optical signals entered into the input movable mirrors are different from those of the optical signals entered into the input movable mirrors which adjoin the input movable mirrors adjoined. Therefore, a coherent crosstalk can be avoided.

Also, the optical switch according to the present invention is arranged such that the output movable mirrors of the optical switch are separated into a plurality of areas to be arranged, and further are arranged in each area so that a path switchover between two output movable mirrors is performed without the optical signal crossing other output movable mirrors. Therefore, the path switchover without the occurrence of the crosstalk can be performed.

Thus, the optical switch according to the present invention can eliminate the crosstalk which may occur upon the path establishment or the path switchover, thereby eliminating a deterioration of an optical signal quality.

What we claim is:

1. An optical switch comprising:

a plurality of input ports, a plurality of output ports, and interception means for intercepting an optical signal at a preceding stage of the input ports during a path switchover.

2. The optical switch as claimed in claim 1 wherein the interception means comprise an optical switch element provided between the optical switch and a light source of the optical signal.

3. The optical switch as claimed in claim 1 wherein the interception means comprise an optical amplifier provided between the optical switch and a light source of the optical signal.

4. The optical switch as claimed in claim 1 wherein the interception means comprise a controller which turns on/off a light source of the optical signal.

5. The optical switch as claimed in claim 1 wherein the interception means comprise an optical modulator for modulating the optical signal.

6. The optical switch as claimed in claim 1, wherein the interception means comprise a collimator controller to shift a focus of a collimator arranged on an input port side.

7. The optical switch as claimed in claim 1, wherein the optical switch comprises a movable mirror-type optical switch to perform the path switchover with movable mirrors.

8. An optical switch comprising:

a plurality of input ports, a plurality of output ports, movable mirrors to establish paths between the input ports and the output ports, and a controller to control the movable mirrors, during a path switchover, so as to prevent optical signals deflected by the movable mirrors from being outputted to all of the output ports except an output port for a new path establishment.

9. An optical switch comprising:

a plurality of input ports, a plurality of output ports, and an optical switch element to intercept optical signals at a preceding stage of the input ports during a path switchover.

10. A method of switching the path of optical signals, comprising:

receiving plural optical signals;

performing switchover of at least one of the optical signals;

outputting the optical signals received; and intercepting the at least one optical signal to be switched over at a point of receiving the optical signal to prevent cross-talk of other received optical signals caused by the at least one switched over optical signal.

* * * * *